(12) United States Patent
Ukai

(10) Patent No.: US 7,783,868 B2
(45) Date of Patent: Aug. 24, 2010

(54) INSTRUCTION FETCH CONTROL DEVICE AND METHOD THEREOF WITH DYNAMIC CONFIGURATION OF INSTRUCTION BUFFERS

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 389 days.

(21) Appl. No.: 10/368,670

(22) Filed: Feb. 20, 2003

(65) Prior Publication Data

US 2004/0003203 A1  Jan. 1, 2004

(30) Foreign Application Priority Data

Jun. 28, 2002  (JP) ............................ 2002-191463

(51) Int. Cl.
*G06F 9/00* (2006.01)
*G06F 15/00* (2006.01)

(52) U.S. Cl. ...................... 712/237; 712/205; 712/238; 712/239

(58) Field of Classification Search ................. 712/205, 712/237, 238, 239
See application file for complete search history.

(56) References Cited

U.S. PATENT DOCUMENTS 4,200,927 A * 4/1980 Hughes et al. .............. 712/235
4,991,078 A * 2/1991 Wilhelm et al. ............. 712/218
6,065,115 A * 5/2000 Sharangpani et al. ....... 712/235
2001/0027515 A1  10/2001 Ukai et al.

FOREIGN PATENT DOCUMENTS

| JP | A-62-128338 | 6/1987 |
|----|-------------|--------|
| JP | 2-306340 | 12/1990 |
| JP | 4-182736 | 6/1992 |
| JP | 4-205427 | 7/1992 |
| JP | A-6-35700 | 2/1994 |
| JP | A-6-89173 | 3/1994 |
| JP | A-6-274340 | 9/1994 |
| JP | A-10-283184 | 10/1998 |
| JP | A-2000-181709 | 6/2000 |
| JP | 2001-166934 | 6/2001 |

OTHER PUBLICATIONS

Notice of Rejection Grounds for corresponding Japanese Application No. 2002-191436 dated Feb. 7, 2006.
Notice of Rejection Grounds for corresponding Japanese Application No. 2002-191436 dated May 16, 2006.
U.S. Appl. No. 09/461,422, filed Dec. 16, 1999, Michiharu Hara et al.

* cited by examiner

*Primary Examiner*—Aimee J Li
(74) *Attorney, Agent, or Firm*—Staas & Halsey LLP

(57) ABSTRACT

This is an instruction fetch control device supplying instructions to an instruction execution unit. The device comprises a plurality of instruction buffers storing an instruction string to be supplied to the instruction execution unit and a designation unit designating an instruction buffer storing the instruction string to be supplied next for each of the plurality of instruction buffers.

48 Claims, 13 Drawing Sheets

I-Buffer A #0

I-Buffer A #1

I-Buffer A #2

I-Buffer B #0

I-Buffer B #1

I-Buffer B #2

I-Buffer C #0

I-Buffer C #1

I-Buffer C #2

F I G. 1

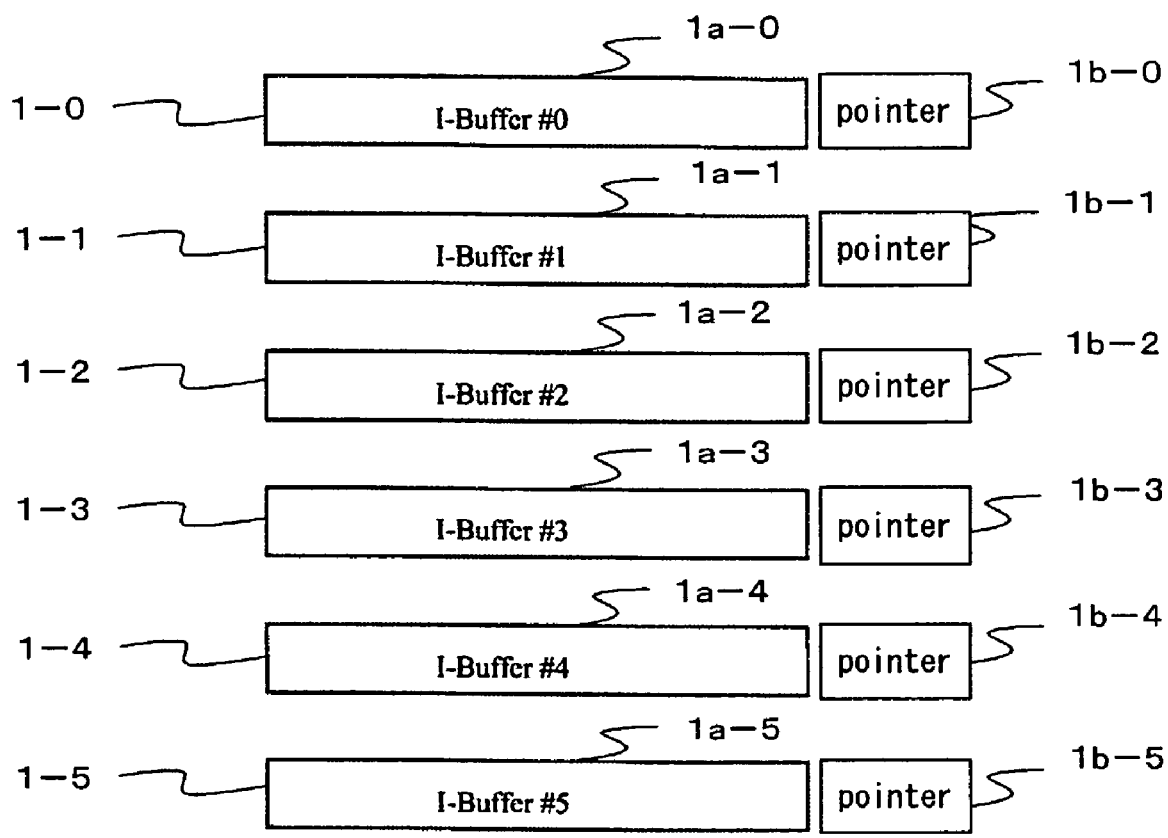
F I G. 2

IN THE CASE WHERE NO BRANCH IS PREDICTED
*ARROW MARKS INDICATE A POINTER DESIGNATOR*
F I G. 3 A
IN THE CASE WHERE ALL BRANCHES ARE PREDICTED
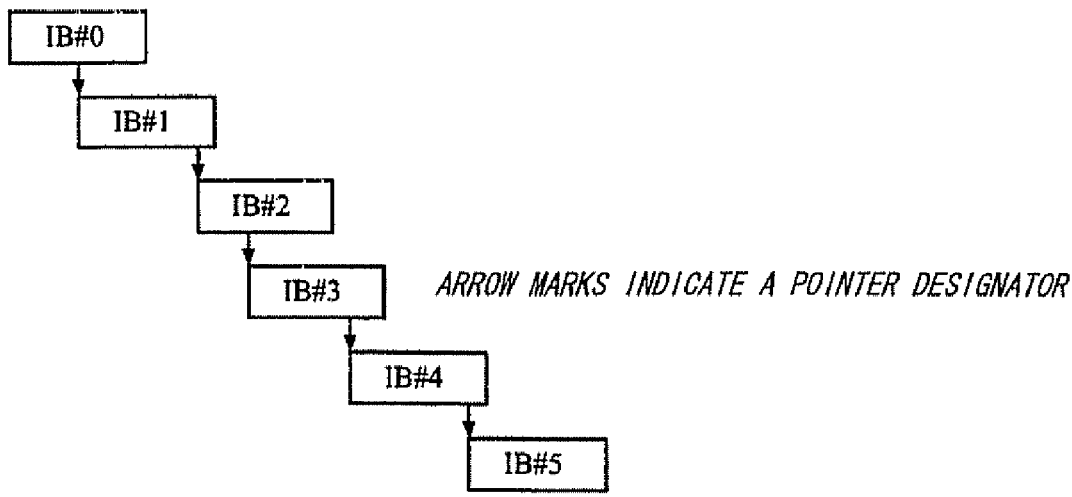
*ARROW MARKS INDICATE A POINTER DESIGNATOR*
F I G. 3 B
IN THE CASE OF GENERAL OPERATION
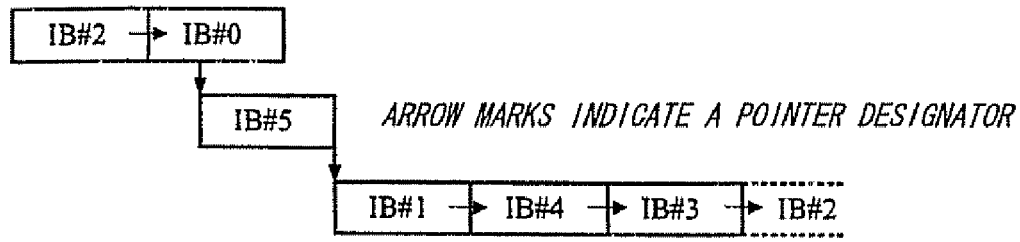
*ARROW MARKS INDICATE A POINTER DESIGNATOR*
F I G. 3 C

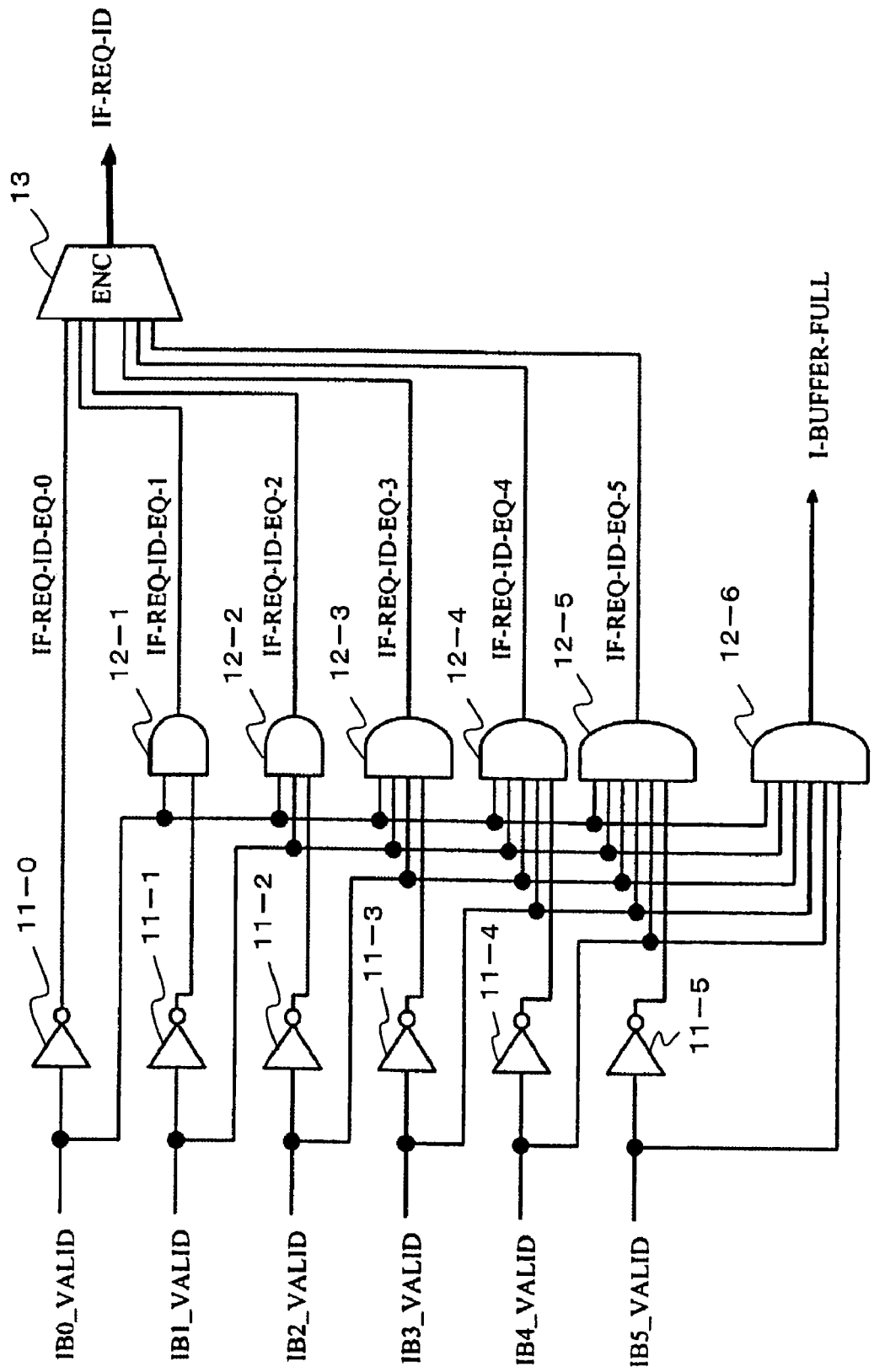
F I G. 5

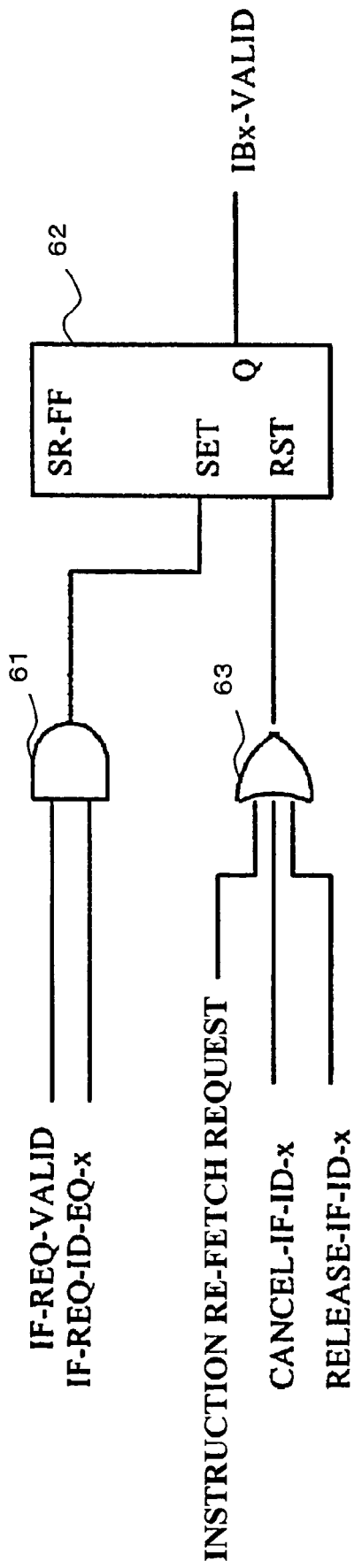
F I G. 1 0

INSTRUCTION FETCH CONTROL DEVICE AND METHOD THEREOF WITH DYNAMIC CONFIGURATION OF INSTRUCTION BUFFERS

BACKGROUND OF THE INVENTION

1. Field of the Invention

The present invention relates to a data processing device and in particular, relates to an instruction fetch control device for fetching an instruction and feeding it to an instruction execution unit (instruction execution processing unit) and a method thereof.

2. Description of the Related Art

In a data processing device adopting an advanced instruction processing method such as a pipeline processing system or subsequent ones, performance has been improved by speculatively fetching a subsequent instruction (fetch instruction) and speculatively processing the instruction without waiting until the execution of the current instruction has completed.

In such a data processing device, for example, by providing an instruction fetch unit that is completely decoupled from an instruction execution unit closely coupled with a branch prediction mechanism, sufficient instruction fetching capacity needed by the instruction execution unit and improved instruction fetch performance are realized.

There is also a configuration using a trace cache for the instruction fetch unit. In this configuration, decoded instruction string that is made packets is stored in the trace cache in advance. When the instruction string is used next time, instruction fetch is avoided by using the stored instruction string and omitting processes ranging from instruction fetch to decoding.

However, since in this configuration, decoded information is stored, entry size (capacity) becomes large, which is a disadvantage. Furthermore, if this configuration is linked to branch prediction, such information must be stored for each branch prediction destination. Therefore, large trace cache capacity is needed in a specific instruction area. In this case, it is difficult to secure trace cache capacity sufficient to cover a wide instruction area.

Furthermore, in the configuration using a trace cache, since decoded information must be stored, a decoding process must be performed before information is stored in the trace cache (when instruction fetch data from an instruction cache and the like is registered). Therefore, in the case of mis-trace caching (when branch prediction fails), a process storing the information in the trace cache and the like must be performed in addition to normal processes for instruction fetch from an instruction cache and decoding information. Therefore, in the case of mis-trace caching, an overhead becomes large.

For such a reason, the configuration using a trace cache is remarkably effective in a narrow target instruction area of a single small benchmark test and the like. However, even an instruction cache is miss-traced in an actual environment where a plurality of applications are executed, as in a server performing a large-scale transaction process. Therefore, in a trace cache that covers a narrower instruction area than that of an instruction cache, there are frequent mis-traces. In other words, a configuration using a trace cache is not effective in an actual environment, even worse, process performance remarkably degrades.

Furthermore, a trace cache is a kind of cache memory and requires cache coherence control like a general instruction cache. Therefore, such control becomes complex. For example, when it is necessary to rewrite an instruction string due to store instruction, processes for updating and nullifying a trace cache become complex and the control unit requires a complex design accordingly, which is another disadvantage.

However, when an instruction is fetched using an instruction buffer, there is no such problem since the configuration was originally developed for a main frame.

However, in the configuration using this instruction buffer, the average efficiency in use of an instruction buffer is low since the instruction buffer is static, which is another problem.

For example, there is a configuration which fetches an instruction using a plurality of instruction buffers that are grouped into a plurality of systems.

FIG. 1 shows an example of such a configuration for fetching an instruction using a plurality of instruction buffers.

In the example shown in FIG. 1, there are a plurality of instruction buffers (I-Buffer #0, #1 and #2) for each of three systems (A, B and C). In this case, when a branch has not been predicted, the plurality of instruction buffers belonging to one system are used. When a branch has been predicted, the plurality of instruction buffers belonging to a system other than the system that has been used, is used. Therefore, in the case of this configuration, when a branch has not been predicted, since only one system of the three systems is used, the use efficiency of the instruction buffers is one third. When there is frequent branch prediction, only a part of the instruction buffers of each system is used although all three systems are used. Therefore, the use efficiency also becomes low. In the case of a static instruction buffer configuration in which instruction buffers are fixedly determined depending on whether a branch as been predicted, the use efficiency of instruction buffers varies depending on the number of branch predictions and the use efficiency of the used instruction buffers becomes low, which is a problem.

Long distance wiring naturally caused by recent giant configurations due to the recent miniaturization of LSI processes has been the major factor obstructing high-speed operation, and the increase in the number of trace caches and instruction buffers incurs a great disadvantage. However, in order to improve performance, as many instruction buffers as possible that prevent delay in transfer of an instruction from main memory, cache memory and the like to an instruction execution unit are required.

SUMMARY OF THE INVENTION

The present invention has been made to solve the disadvantages and problems described above. It is an object of the present invention to improve the use efficiency of instruction buffers and to make the instruction buffers as compact as possible.

An instruction fetch control device in the first aspect of the present invention supplies instructions to an instruction execution unit. The instruction fetch control device comprises a plurality of instruction buffers storing an instruction string to be supplied to the instruction execution unit, and a designation unit designating an instruction buffer storing an instruction string to be supplied next for each of the plurality of instruction buffers.

According to such a configuration, an instruction buffer storing an instruction string to be supplied next to an instruction string stored in the instruction buffer is designated by the designation unit. In this way, instruction buffers can be dynamically configured and the use efficiency of instruction buffers can be improved in a compact configuration.

An instruction fetch control device in the second aspect of the present invention supplies instructions to an instruction execution unit. The instruction fetch control device comprises a plurality of instruction buffers storing instruction strings to be supplied to the instruction execution unit and designation information designating an instruction buffer storing an instruction string to be supplied next to the relevant instruction string and a designation unit designating an instruction buffer storing a subsequent instruction string to be supplied next for each of the plurality of instruction buffers, based on the corresponding designation information.

According to such a configuration, an instruction buffer storing a subsequent instruction string to be supplied next to the instruction string stored in the instruction buffer is designated by the designation unit. In this way, instruction buffers can be dynamically configured and the use efficiency of instruction buffers can be improved in a compact configuration.

An instruction fetch control device in the third aspect of the present invention supplies instructions to an instruction execution unit. The instruction fetch control device comprises a plurality of instruction buffers storing instruction strings to be supplied to the instruction execution unit and designation information designating an instruction buffer storing an instruction strings to be supplied next to the relevant instruction string and a designation unit designating an instruction buffer storing an branch prediction target instruction string to be supplied next for each of the plurality of instruction buffers, based on the corresponding designation information.

According to such a configuration, an instruction buffer storing a branch prediction target instruction string to be supplied next to the instruction string stored in the instruction buffer is designated by the designation unit. In this way, instruction buffers can be dynamically configured and the use efficiency of instruction buffers can be improved in a compact configuration.

BRIEF DESCRIPTION OF THE DRAWINGS

The present invention will be more apparent from the following detailed description when the accompanying drawings are referenced, in which FIG. 1 shows an example of a configuration for fetching an instruction using a plurality of instruction buffers that are grouped into a plurality of systems;

FIG. 2 shows an example of the conceptual configuration of an instruction buffer applied to an instruction fetch control device according to one preferred embodiment of the present invention;

FIG. 3A shows a typical example of use of an instruction buffer based on the designation of a pointer section (No. 1);

FIG. 3B shows a typical example of use of an instruction buffer based on the designation of a pointer section (No. 2);

FIG. 3C shows a typical example of use of an instruction buffer based on the designation of a pointer section (No. 3);

FIG. 5 shows an example of a circuit generating IF-REQ-ID included in an instruction fetch request unit;

FIG. 10 shows an example of a circuit setting a valid flag (Valid) in the pointer section;

DESCRIPTION OF THE PREFERRED EMBODIMENTS

Figure 4:
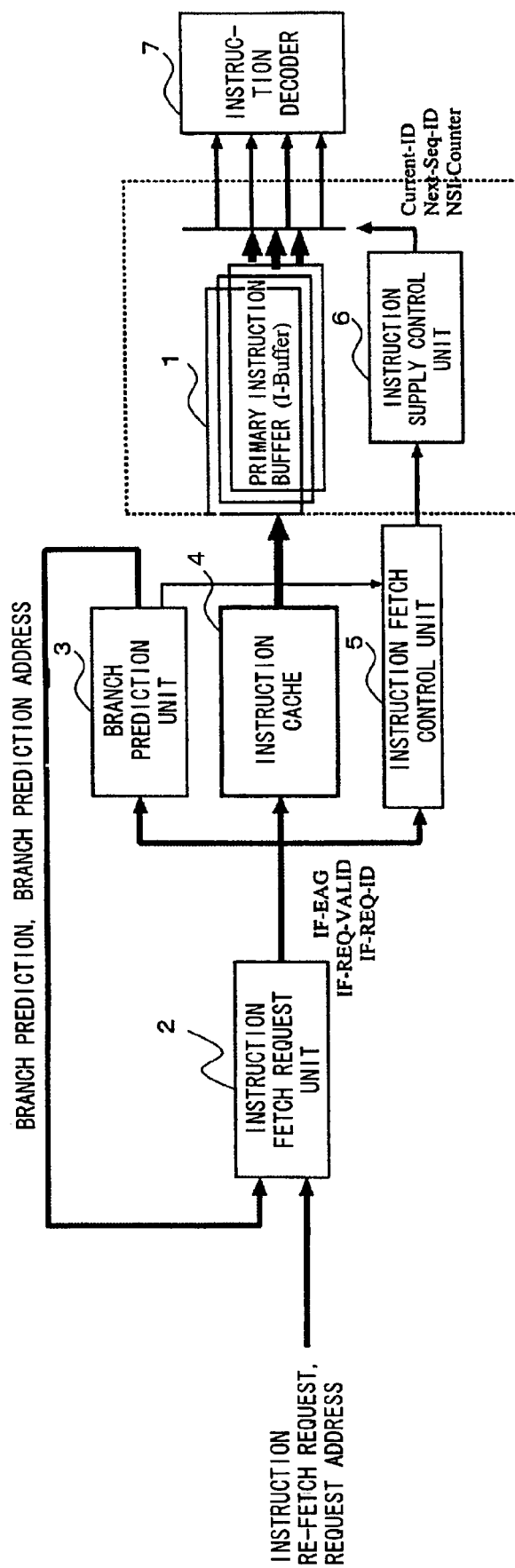
FIG. 4 shows an example of the configuration of an instruction fetch control device according to one preferred embodiment of the present invention.

The preferred embodiments of the present invention are described below with reference to the drawings.

FIG. 2 shows an example of the conceptual configuration of an instruction buffer used in an instruction fetch control device according to the one preferred embodiment of the present invention.

As shown in FIG. 2, the configuration comprises six instruction buffers 1-$i$ (i=0, 1, 2, 3, 4, 5) (I-Buffer#0, #1, #2, #3, #4 and #5 in FIG. 2). In this example, although the number of instruction buffers is six, it is not limited to six.

Each instruction buffer 1-I (i=0 through 5) further comprises data sections 1$a$-$i$ (i=0, 1, 2, 3, 4, 5) storing instruction strings and pointer sections 1$b$-$i$ (i=0, 1, 2, 3, 4, 5) designating an instruction buffer 1 storing an instruction string to be supplied next to an instruction buffer stored in the relevant instruction buffer 1 (pointer in FIG. 2). The relevant instruction buffer 1 and an instruction buffer 1 storing an instruction string to be supplied next are linked by an instruction fetch request unit 2 and a branch prediction unit 3. Based on the designation of this pointer section 1$b$, an instruction string is supplied to an instruction execution unit interpreting and executing instruction strings.

FIGS. 3A, 3B and 3C show a typical example of use of an instruction buffer 1 based on the designation of the pointer section 1$b$. In FIGS. 3A, 3B and 3C, arrow marks indicate the designation of pointer sections 1$b$.

FIG. 3A shows a case where no branch has been predicted. In this case, the pointer section 1$b$ of an instruction buffer 1 designates an instruction buffer 1 storing a subsequent instruction string as an instruction string to be supplied next to the current instruction string stored the relevant instruction buffer 1. Specifically, pointer sections 1$b$-0, 1$b$-1, 1$b$-2, 1$b$-3 and 1$b$-4 designate instruction buffers 1-1, 1-2, 1-3, 1-4 and 1-5, respectively, as an instruction buffer 1 storing a subsequent instruction string to be supplied next.

FIG. 3B shows a case where each instruction string stored in each instruction buffer 1 includes an instruction for which a branch has been predicted (a branch has been predicted in all instruction buffers 1). In this case, a branch has been predicted in an instruction string stored in the relevant instruction buffer 1 and the pointer section 1$b$ of an instruction buffer 1 designates an instruction buffer 1 storing a branch prediction target instruction string to be supplied next. Specifically, pointer sections 1$b$-0, 1$b$-1, 1$b$-2, 1$b$-3 and 1$b$-4 designate instruction buffers 1-1, 1-2, 1-3, 1-4 and 1-5 as an instruction buffer 1 storing a branch prediction target instruction string to be supplied next.

FIG. 3C shows a general case. In this case, the pointer section 1$b$ of an instruction buffer 1 designates the case shown in FIGS. 3A or 3B. Specifically, a pointer section 1$b$-2 designates an instruction buffer 1-0 as an instruction buffer 1 storing a subsequent instruction string to be supplied next, pointer sections 1b-0 and 1b-5 designate instruction buffers 1-5 and 1-1, respectively, as an instruction buffer 1 storing a branch prediction target instruction string to be supplied next, and pointer sections 1b-1 and 1b-4 designate instruction buffers 1-4 and 1-3, respectively, as an instruction buffer 1 storing a subsequent instruction string to be supplied next.

After an instruction string is supplied to the instruction execution unit or branch prediction fails or the like, instruction buffer 1 storing an unnecessary instruction string is nullified, and data sections 1a and pointer sections 1b are nullified/initialized so as to be used again for a new instruction fetch request.

According to such a configuration, the static instruction buffer can be made dynamic, and the use efficiency of an instruction buffer can be improved. Accordingly, an instruction buffer can be compactly configured.

When rewriting of an instruction string by a store instruction etc. occurs and it is judged that the control is needed to maintain cache coherence, all instruction buffers 1 can be nullified and instructions can be re-fetched. In other words, since cache coherence control is exercised over cache memory, the coherence of the instruction buffers 1 can be maintained by extracting an instruction string from the cache memory again in this way.

Next, an instruction fetch control device according to one preferred embodiment of the present invention that is used in a data processing device is described in detail.

In a data processing device according to the preferred embodiment, an instruction fetch pipeline comprises five stages of an IA stage, an IT stage, an IM stage, an IB stage and an IR stage.

FIG. 4 shows an example of the configuration of an instruction fetch control device according to one preferred embodiment of the present invention. In this preferred embodiment, it is assumed that each instruction buffer 1 described earlier can store an instruction string of 32-byte instruction word length (instruction word).

In FIG. 4, an instruction fetch request unit 2 requests an instruction fetch as long as there is a nullified instruction buffer 1. The instruction fetch request unit 2 outputs an instruction fetch request address (IF-EAG) used to retrieve instruction data from an instruction cache 4, an instruction fetch request signal (IF-REQ-VALID) and an identifier (IF-REQ-ID) used to designate one nullified instruction buffer 1, based on an instruction re-fetch request signal and an instruction re-fetch request address that are input, a branch prediction target instruction fetch request signal and a branch prediction target instruction fetch request address that are output from a branch prediction unit 3 or an instruction address generated inside by adding 32 bytes to IF-EAG each time. In this way, an instruction string corresponding to IF-EAG is read from the instruction data stored in the instruction cache 4 and is stored in the data section 1a of an instruction buffer 1 corresponding to IF-REQ-ID.

A branch prediction unit 3 predicts whether the instruction string corresponding to IF-EAG includes a branch instruction to establish a branch. If it is predicted that such an instruction is included, the unit 3 predicts the branch target instruction address and outputs a branch prediction target instruction fetch request signal to the instruction fetch request unit 2 together with the predicted branch target instruction address. In this case, the unit 3 also outputs information indicating that the instruction string corresponding to IF-EAG includes an instruction that is for which branch establishment has been predicted and information indicating the position in an instruction string of the predicted branch instruction, to an instruction fetch control unit 5.

The instruction fetch control unit 5 stores information designating an instruction buffer 1 storing an instruction string to be supplied next to the current instruction string stored in the relevant instruction buffer 1 in the pointer section 1b of an instruction buffer 1 storing the instruction string corresponding to IF-EAG. Furthermore, if the branch prediction unit 3 has predicted that the instruction string corresponding to IF-EAG includes an instruction for which branch establishment has been predicted, the unit 5 stores information indicating that the instruction string corresponding to IF-EAG includes the instruction for which branch establishment has been predicted and information indicating the position in an instruction string of the predicted instruction that are output from the branch prediction unit 3 in the pointer 1b.

As described earlier, each instruction buffer (primary instruction buffer (I-Buffer) in FIG. 4) 1 comprises a data section 1a and a pointer section 1b. The data section 1a can store a 32-byte instruction string. One of identifiers 0-5 is attached to each of six instruction buffers 1. In this preferred embodiment, it is assumed that the identifiers of instruction buffer 1-0, 1-1, 1-2, 1-3, 1-4, 1-5 are 0 (#0), 1 (#1), 2 (#2), 3 (#3), 4 (#4) and 5 (#5), respectively.

An instruction supply control unit 6 (designation unit, designation means) sets a Current-ID (the first identifier) representing the identifier of an instruction buffer 1 storing the instruction string to be supplied next to an instruction decoding unit 7, a Next-Seq-ID (the second identifier) representing the identifier of an instruction buffer 1 storing an instruction string to be supplied next to the instruction string stored in the instruction buffer 1 represented by Current-ID and an NSI-Counter (offset value) representing the offset of the instruction string stored in the instruction buffer 1 represented by Current-ID. In this way, an instruction string stored in the instruction buffer 1 is supplied to the instruction decoding unit 7, based on Current-ID, Next-Seg-ID and NSI-Counter that are set by the instruction supply control unit 6.

Next, the main circuit of the instruction fetch request unit 2 described earlier is described with reference to FIGS. 5 and 6.

FIG. 5 shows an example of the configuration of a circuit generating IF-REQ-ID that is included in the instruction fetch request unit 2.

The circuit shown in FIG. 5 searches for one nullified instruction buffer 1, based on information stored in the pointer section 1b of each instruction buffer 1, and outputs the identifier of the searched instruction buffer as IF-REQ-ID.

The information stored in the pointer section 1b of each instruction buffer 1 stores a valid flag (Valid) indicating whether the relevant instruction buffer 1 is valid or invalid. In FIG. 5, the valid flag read from the pointer section 1b of each instruction buffer 1 is shown as IBi_VALID (i=0, 1, 2, 3, 4, 5). In other words, IBi_VALID (i=0 through 5) represents the valid flag of an instruction buffer 1-i (i=0 through 5).

In the circuit shown in FIG. 5, a priority is given to each instruction buffer 1, and the circuit outputs the identifier of an instruction buffer 1 with the highest priority of the instruction buffers whose valid flag is invalid, as IF-REQ-ID.

In other words, since such IF-REQ-ID is output, the circuit shown in FIG. 5 operates as follows.

When an input from an inverter circuit 11-0 is "H" and other inputs are "L", that is, when at least the valid flag of the instruction buffer 1-0 is invalid (IB0_VALID="L"), an encoder circuit (ENC) 13 outputs 0, which is the identifier of the instruction buffer 1-0, as IF-REQ-ID. In this case, the output signal of the inverter circuit 11-0 is also a signal IF-REQ-ID-EQ-0.

In this preferred embodiment, "H" and "L" indicate logical "true (1)" and "false (0)", respectively.

When an input from an AND circuit 12-1 is "H" and other inputs are "L", that is, when at least the valid flags of the instruction buffers 1-0 and 1-1 are valid and invalid (IB1_VALID="L"), respectively, the encoder circuit 13 outputs 1, which is the identifier of the instruction buffer 1-1, as IF-REQ-ID. In this case, the output signal of an AND circuit 12-1 is also a signal IF-REQ-ID-EQ-1.

When an input from an AND circuit 12-2 is "H" and other inputs are "L", that is, when at least the valid flags of the instruction buffers 1-0 and 1-1 are valid and the valid flag of an instruction buffer 1-2 is invalid (IB2_VALID="L"), the circuit 13 outputs 2, which is the identifier of the instruction buffer 1-2, as IF-REQ-ID. In this case, the output signal of an AND circuit 12-2 is also a signal IF-REQ-ID-EQ-2.

When an input from an AND circuit 12-3 is "H" and other inputs are "L", that is, when at least the valid flags of instruction buffers 1-0 through 1-2 are valid and the valid flag of an instruction buffer 1-3 is invalid (IB3_VALID="L"), the circuit 13 outputs 3, which is the identifier of the instruction buffer 1-3, as IF-REQ-ID. In this case, the output signal of an AND circuit 12-3 is also a signal IF-REQ-ID-EQ-3.

When an input from an AND circuit 12-4 is "H" and other inputs are "L", that is, when at least the valid flags of instruction buffers 1-0 through 1-3 are valid and the valid flag of an instruction buffer 1-4 is invalid (IB4_VALID="L"), the circuit 13 outputs 4, which is the identifier of an instruction buffer 1-4, as IF-REQ-ID. In this case, the output signal of the AND circuit 12-4 is also a signal IF-REQ-ID-EQ-4.

When an input from an AND circuit 12-5 is "H" and other inputs are "L", that is, when at least the valid flags of instruction buffers 1-0 through 1-4 are valid and the valid flag of an instruction buffer 1-5 is invalid (IB5_VALID="L"), the circuit 13 outputs 5, which is the identifier of an instruction buffer 1-5, as IF-REQ-ID. In this case, the output signal of the AND circuit 12-5 is also a signal IF-REQ-ID-EQ-5.

When the valid flags of all instruction buffers 1 are valid (IBi_VALID (i=0 through 5)="H"), the output of an AND circuit 12-6 becomes "H" (I-BUFFER-FULL). In this case, in the encoder circuit 13, all inputs are "L" and IF-REQ-ID is not output.

According to the configuration described above, priority is given in order of instruction buffers 1-0, 1-1, 1-2, 1-3, 1-4 and 1-5, and the identifier of an instruction buffer 1 with the highest priority of instruction buffers whose valid flag is invalid is output as IF-REQ-ID.

Figure 6:
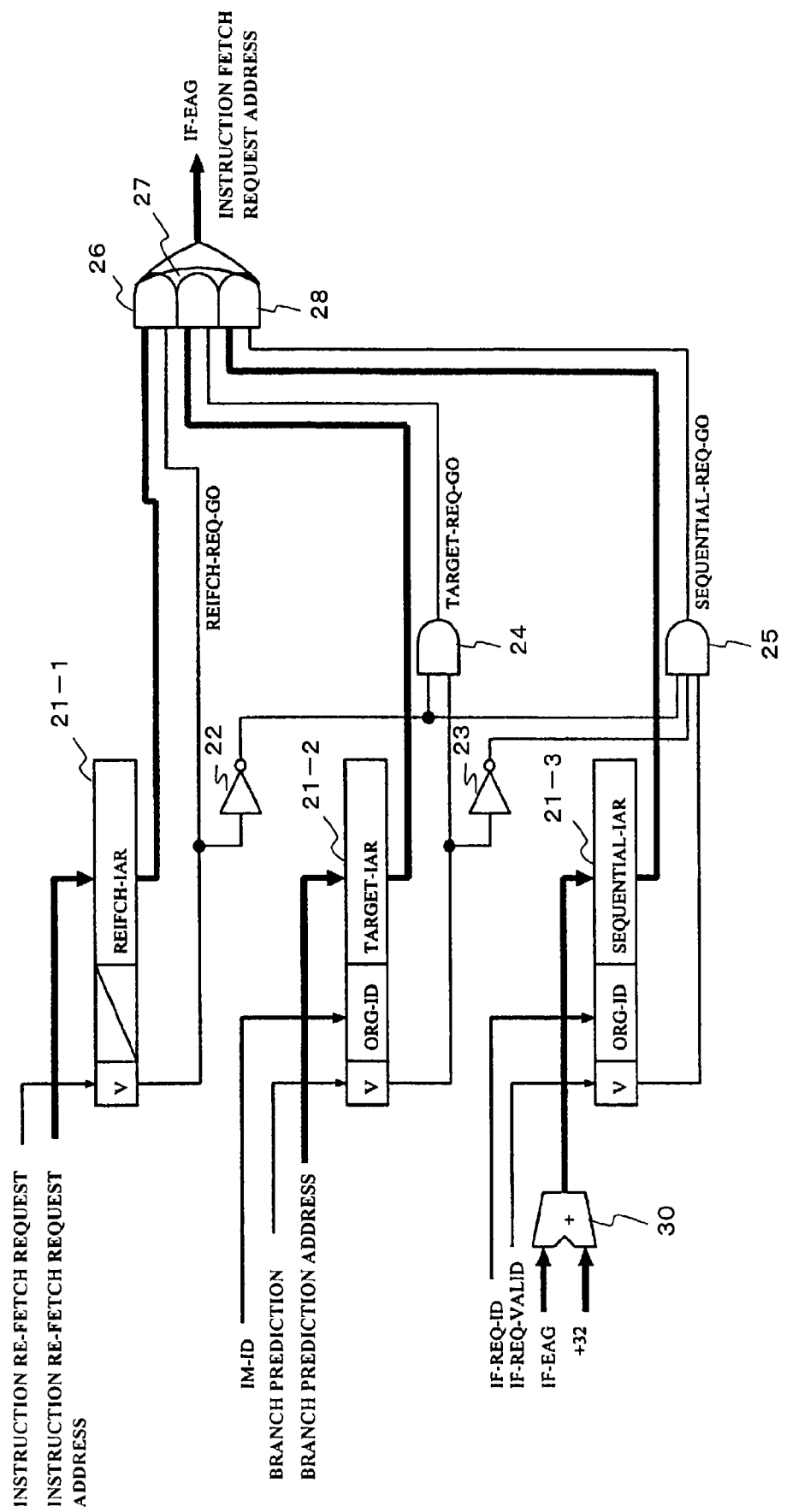
FIG. 6 shows an example of a circuit generating an instruction fetch request address (IF-IAG) included in an instruction fetch request unit.

FIG. 6 shows an example of the configuration of a circuit generating an instruction fetch request address (IF-EAG) that is included in the instruction fetch request unit 2.

When an instruction re-fetch request is issued, the circuit shown in FIG. 6 outputs an instruction re-fetch request address. When a branch prediction target instruction fetch request instead of the instruction re-fetch request is issued, it outputs a branch prediction target instruction fetch request address. When neither an instruction fetch request nor a branch prediction target instruction fetch request is issued (a subsequent instruction fetch request is issued), a subsequent instruction fetch request address generated by adding 32 bytes to IF-EAG.

In this way, priority is given in order of instruction re-fetch request, branch prediction target instruction fetch request and subsequent instruction fetch request, and corresponding instruction request address (IF-EAG) is output according to the priority.

Specifically, if an instruction re-fetch request is issued, that is, if an instruction re-fetch request signal and an instruction re-fetch request address is input, the instruction re-fetch request signal ("H") is stored in a register 21-1 as a valid flag V, and simultaneously is input to an AND circuit 26 and an inverter circuit 22. This instruction re-fetch request signal is also the signal REIFCH-REQ-GO shown in FIG. 6. The instruction re-fetch request address is stored in the register 21-1 (the third register) as REIFCH-IAR, and simultaneously is input to the AND circuit 26. However, since the instruction re-fetch request signal "H" is inverted and the output of the inverter circuit 22 becomes "L", the outputs of AND circuits 24 and 25 that are connected to the output of the inverter circuit 22 become "L", and the outputs of AND circuits 27 and 28 that are connected to the outputs of the AND circuits 24 and 25 also become "L". Therefore, IF-EAG, which is the output of an OR circuit 29 becomes the output of the AND circuit 26, that is, REIFCH-IAR.

If a branch prediction target instruction fetch request is issued instead of the instruction re-fetch request, that is, if a branch prediction instruction fetch request signal and a branch prediction instruction fetch request address is input, the branch prediction target instruction fetch request signal ("H") is stored in a register 21-2 (the second register) as a valid flag V (TARGET-VALID), and simultaneously is input to the AND circuit 24 and an inverter circuit 23. The branch prediction target instruction fetch request address is stored in the register 21-2 as TARGET-TAR, and simultaneously is input to the AND circuit 27. However, since an instruction re-fetch request is not issued, the output of the AND circuit 26 becomes "L" and the output of the inverter circuit 22 becomes "H". Therefore, the output of the AND circuit 24 becomes "H". In this case, the output signal of this AND circuit 24 is also the signal TARGET-REQ-GO shown in FIG. 6. Since the branch prediction target instruction fetch request signal "H" is inverted, the output of the inverter circuit 23 becomes "L", and the output of an AND circuit 25 that is connected to the output of the inverter circuit 23 becomes "L". Therefore, the output of the AND circuit 28 that is connected to the output of the AND circuit 25 also becomes "L". Therefore, IF-EAG, which is the output of the OR circuit 29, becomes the output of the AND circuit 27, that is, TARGET-IAR.

IM-ID is stored in the register 21-2 as ORG-ID (TARGET-ORG-ID, branch prediction target instruction fetch request origin information). IM-ID is IF-REQ-ID described when a branch has been predicted, and indicates that the branch has been predicted in the IM stage of the five stages described earlier. In this way, when an branch prediction target instruction fetch request is issued, the identifier of an instruction buffer 1 corresponding to the branch prediction target instruction fetch request origin can be stored and can be linked to the identifier of the instruction buffer 1 corresponding to the branch prediction target instruction fetch request.

If neither an instruction re-fetch request nor a branch prediction target instruction fetch request is issued (a subsequent instruction fetch request is issued), an instruction fetch request signal (IF-REQ-VALID="H") is stored in a register 21-3 (the first register) as a valid flag V (SEQUENTIAL-VALID), and simultaneously is input to the AND circuit 25. A subsequent instruction fetch request address that an adder 30 has generated by adding 32 bytes to IF-EAG is stored in the register 21-3 as SEQUENTIAL-IAR, and simultaneously is input to the AND circuit 28. However, since neither an instruction re-fetch request nor a branch prediction target instruction fetch request is issued, REIFCH-REQ-GO and TARGET-REQ-GO become "L", and the outputs of the AND circuits 26 and 27 become "L". The outputs of inverter circuits 22 and 23 become "H", and the output of the AND circuit becomes "H". Then, the output of the AND circuit 25 is input to the AND circuit 28. Therefore, IF-EAG, which is the output of the OR circuit 29, becomes the output of the AND circuit 28, that is, SEQUENTIAL-IAR. In this case, the output signal of the AND circuit 25 is also the signal SEQUENTIAL-REQ-GO shown in FIG. 6.

Furthermore, IF-REQ-ID is stored in the register 21-3 as ORG-ID (SEQUENTIAL-ORG-ID, subsequent instruction fetch request origin information).

In this way, when a subsequent instruction fetch request is issued, the identifier of an instruction buffer 1 corresponding to the subsequent instruction fetch request origin is stored and can be linked to the identifier of an instruction buffer 1 corresponding to the subsequent instruction fetch request.

If an instruction re-fetch request is issued, the valid flag of the data section 1b of each instruction buffer 1 is nullified, and instruction buffers 1 are used from one 1-0 in order. In this case, there is no need to store the identifier of an instruction buffer 1 corresponding to the instruction re-fetch request origin. In this way, IF-REQ-ID is not stored in the register 21-3.

According to such a configuration, an instruction fetch request address corresponding to each instruction fetch request is output, and the identifiers of an instruction buffer 1 corresponding to a branch prediction target instruction fetch request origin and a subsequent instruction fetch request origin are stored.

Next, information stored in the pointer section 1b of an instruction buffer 1 is described. The instruction fetch control unit 5 stores (sets) this information.

Figure 7:
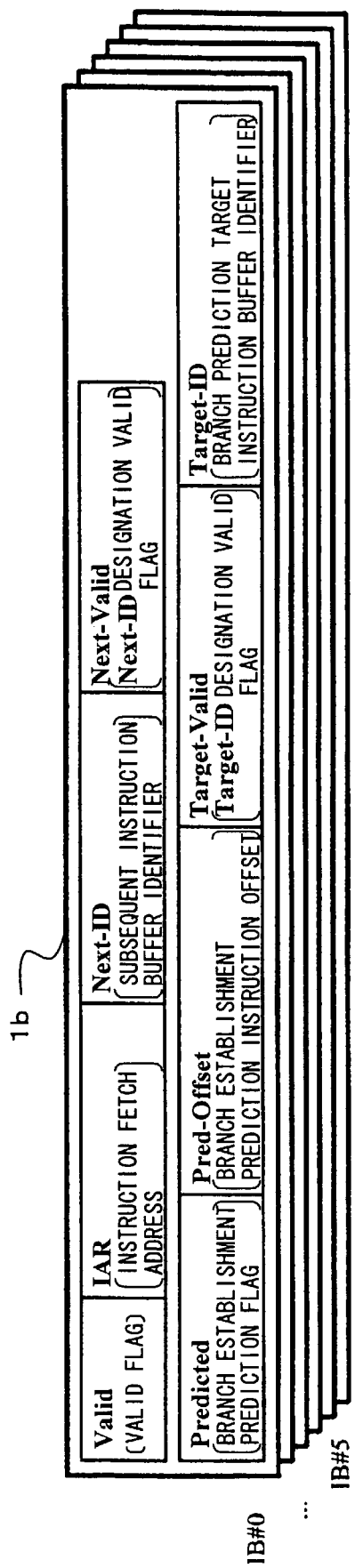
FIG. 7 shows an example of information stored in the pointer section of an instruction buffer.

FIG. 7 shows an example of information stored in the pointer 1b of an instruction buffer 1.

As shown in FIG. 7, a pointer section 1b stores a valid flag (Valid), an instruction fetch address (IAR), a branch establishment prediction flag (Predicted), a branch establishment prediction instruction offset (Pred-Offset), a subsequent instruction buffer identifier (Next-ID, the first designation information), a Next-ID designation valid flag (Next-Valid), a branch prediction target instruction buffer identifier (Target-ID, the second designation information), a Target-ID designation valid flag (Target-Valid) and so on.

As described earlier, the valid flag indicates whether the relevant instruction buffer 1 is valid or invalid.

The instruction fetch address (IAR) is an instruction fetch address (IF-EAG) corresponding to an instruction string stored in the data section 1a of the relevant instruction buffer 1.

When an instruction fetch request is issued and an instruction string corresponding to IF-EAG is stored in an instruction buffer 1 corresponding to IF-REQ-ID, the valid flag and instruction fetch address (IAR) are set in the pointer section 1b.

The branch establishment prediction flag indicates whether an instruction string stored in the relevant instruction buffer includes an instruction for which branch establishment has been predicted.

The branch establishment prediction instruction offset indicates the position in an instruction string of the predicted instruction in the case where the instruction string stored in the relevant instruction buffer 1 includes the instruction for which branch establishment has been predicted. In this way, by storing a branch establishment prediction instruction offset, the position of the instruction for which branch establishment has been predicted when the instruction is issued (supplied) can be easily judged.

The branch establishment prediction flag and branch establishment prediction instruction offset are set based on information that is obtained from the branch prediction unit 3 described earlier.

The subsequent instruction buffer identifier designates the identifier of an instruction buffer 1 storing the instruction string to be supplied next to an instruction string stored in the relevant instruction buffer 1. This identifier is set when a subsequent instruction fetch request corresponding to the relevant instruction buffer 1 is issued.

The Next-ID designation valid flag indicates whether a subsequent instruction buffer identifier is valid or invalid. When this subsequent instruction buffer identifier is set, a flag indicating validity is set.

The branch prediction target instruction buffer identifier designates the identifier of an instruction buffer 1 storing a branch prediction target instruction string to be supplied next to an instruction string stored in the relevant instruction buffer 1. This identifier is set when a branch prediction target instruction fetch request corresponding to the relevant instruction buffer 1 is issued.

The Target-ID designation valid flag indicates whether a branch prediction target instruction buffer identifier is valid or invalid. When this branch prediction target instruction buffer identifier is set, a flag indicating validity is set.

In FIG. 7, although the pointer section 1b stores these pieces of information, information stored in the pointer section 1b is not limited to these. It is sufficient for the pointer section 1b to store at least a subsequent instruction buffer identifier, a Next-ID designation valid flag, a branch prediction target instruction buffer identifier and a Target-ID designation valid flag.

Next, the main circuit configuration of the instruction fetch control unit 5 is described with reference to FIGS. 8 through 10.

Figure 8:
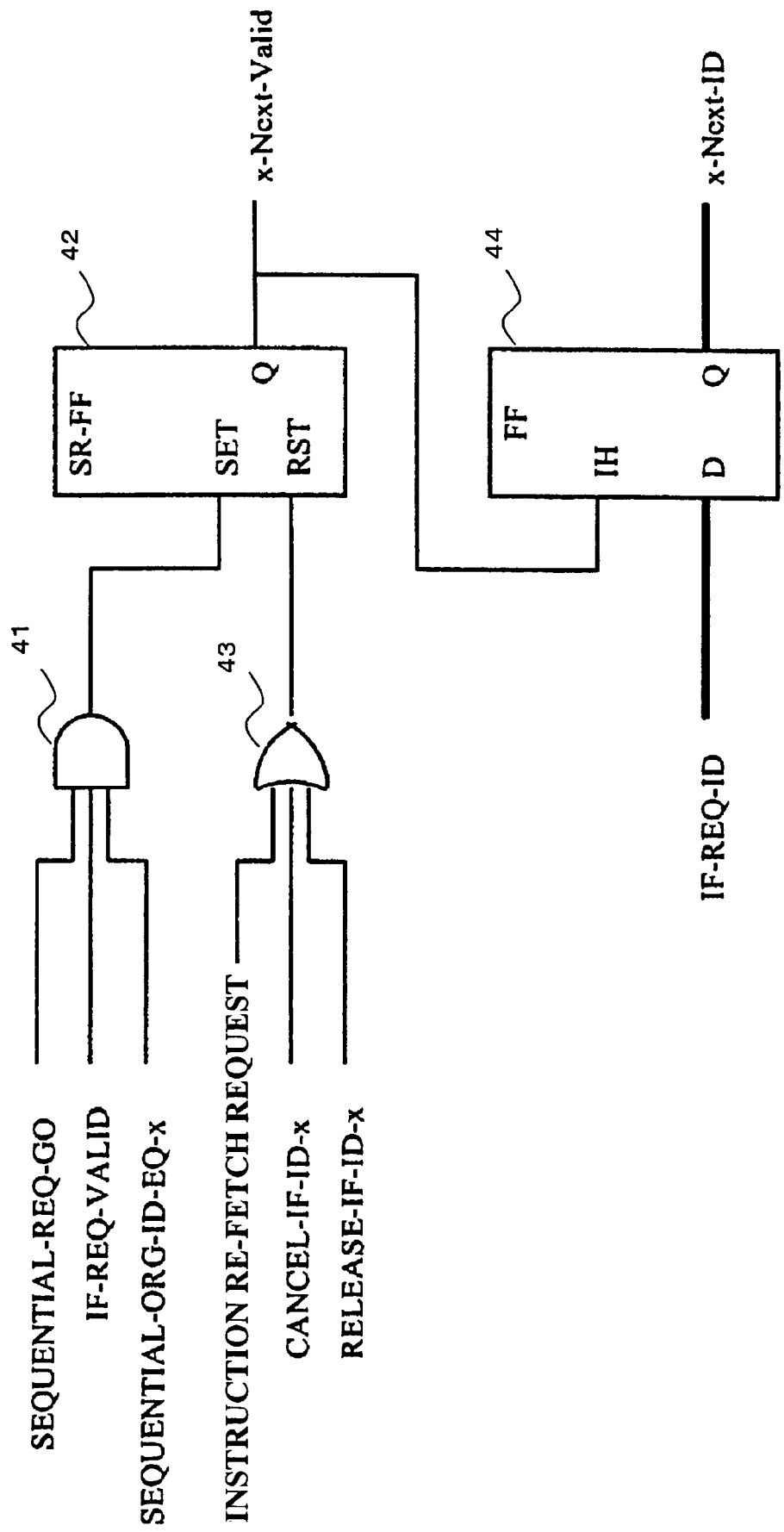
FIG. 8 shows an example of a circuit setting a subsequent instruction buffer identifier (Next-ID) and a Next-ID designation valid flag (Next-Valid) in the pointer section.

FIG. 8 shows an example of the configuration of a circuit setting a subsequent instruction buffer identifier (Next-ID) and a Next-ID designation valid flag (Next-Valid) in the pointer section 1b described earlier. The circuit shown in FIG. 8 is provided for each instruction buffer 1.

In FIG. 8, if signals SEQUENTIAL-REQ-GO (the output signal of the AND circuit 25 shown in FIG. 6), IF-REQ-VALID (instruction fetch request signal) and SEQUENTIAL-ORG-ID-EQ-x (x: identifier of an instruction buffer 1) are all "H", the output of an AND circuit 41 becomes "H", and "H" is input to the terminal SET of an SF-FF (flip-flop) 42. The signal SEQUENTIAL-ORG-ID-EQ-x indicates that if when a subsequent instruction fetch request is issued and if SEQUENTIAL-ORG-ID (stored in the register 21-3 shown in FIG. 6) indicating the identifier of an instruction buffer 1 storing the instruction string of a subsequent instruction fetch request origin is x, the relevant signal of this circuit provided in relation to an instruction buffer 1 whose identifier is x, becomes "H".

In this way, if "H" is input to the SET terminal, the output terminal Q of the SR-FF 42 becomes "H", and x-Next-Valid (x: identifier of an instruction buffer 1) is validated. Specifically, the output of the output terminal Q of the SR-FF 42 of this circuit provided in relation to an instruction buffer 1 whose identifier is x, becomes "H", and a flag indicating that Next-ID is valid, is set in the pointer section 1b of an instruction buffer 1 whose identifier is x, as Next-Valid.

When the output terminal Q of the SR-FF 42 becomes "H", "H" is input to the terminal IH of an FF (flip-flop) 44, and the signal IF-REQ-ID currently input to a terminal D is output from the output terminal Q of the FF 44. In this way, x-Next-ID (x: identifier of an instruction buffer 1) is set. Specifically, the IF-REQ-Id output from the output terminal Q of the FF 44 of this circuit provided in relation to an instruction buffer 1 whose identifier is x, is set in the pointer section 1b of an instruction buffer 1 whose identifier is x, as Next-ID.

However, if one of an instruction re-fetch request signal, a signal CANCEL-IF-ID-x (x: identifier of an instruction buffer 1) and a signal RELEASE-IF-ID-x (x: identifier of an instruction buffer 1) is "H", the output of an OR circuit 43 becomes "H", and "H" is input to the terminal RST of the SR-FF 42.

In this case, when an instruction re-fetch request is issued, the instruction re-fetch request signal becomes "H". The instruction is re-fetched, for example, when branch prediction fails, when there is interrupt or when there is the rewriting of an instruction string due to a store instruction, and if it is judged that the control is needed to maintain cache coherence.

The signal CANCEL-IF ID-x indicates that if a speculative fetch is cancelled and the identifier of an instruction buffer 1 whose instruction string is nullified, is x, the relevant signal of this circuit provided in relation to an instruction buffer 1 whose identifier is x becomes "H".

If the signal RELEASE-IF-ID-x indicates that if the identifier of an instruction buffer 1 released by supplying a stored instruction string to the instruction execution unit, is x, the relevant signal of this circuit provided in relation to an instruction buffer 1 whose identifier is x becomes "H". This signal RELEASE-IF-ID-x is issued corresponding to the original Current-ID every time the Current-ID is switched to another ID.

In this way, when "H" is input to the terminal RST, the output terminal Q of the SR-FF 42 becomes "L" and x-Next-Valid is nullified. Specifically, when "H" is input as the signal CANCEL-IF-ID-x or RELEASE-IF-ID-x, the output of the output terminal Q of the SR-FF 42 of this circuit provided in relation to an instruction buffer 1 whose identifier is x, becomes "L", and a flag indicating that Next-ID is invalid, is set in the pointer section 1b of the instruction buffer 1 whose identifier is x, as Next-Valid. If an instruction re-fetch request is issued and "H" is input as an instruction re-fetch request signal, the output of the output terminal Q of each SR-FF 42 of this circuit provided for each instruction buffer 1 becomes "L", and a flag indicating that Next-ID is invalid is set in the pointer section 1b of each instruction buffer 1 as Next-Valid.

According to such a configuration, Next-ID and Next-Valid are set in the pointer section 1b.

Figure 9:
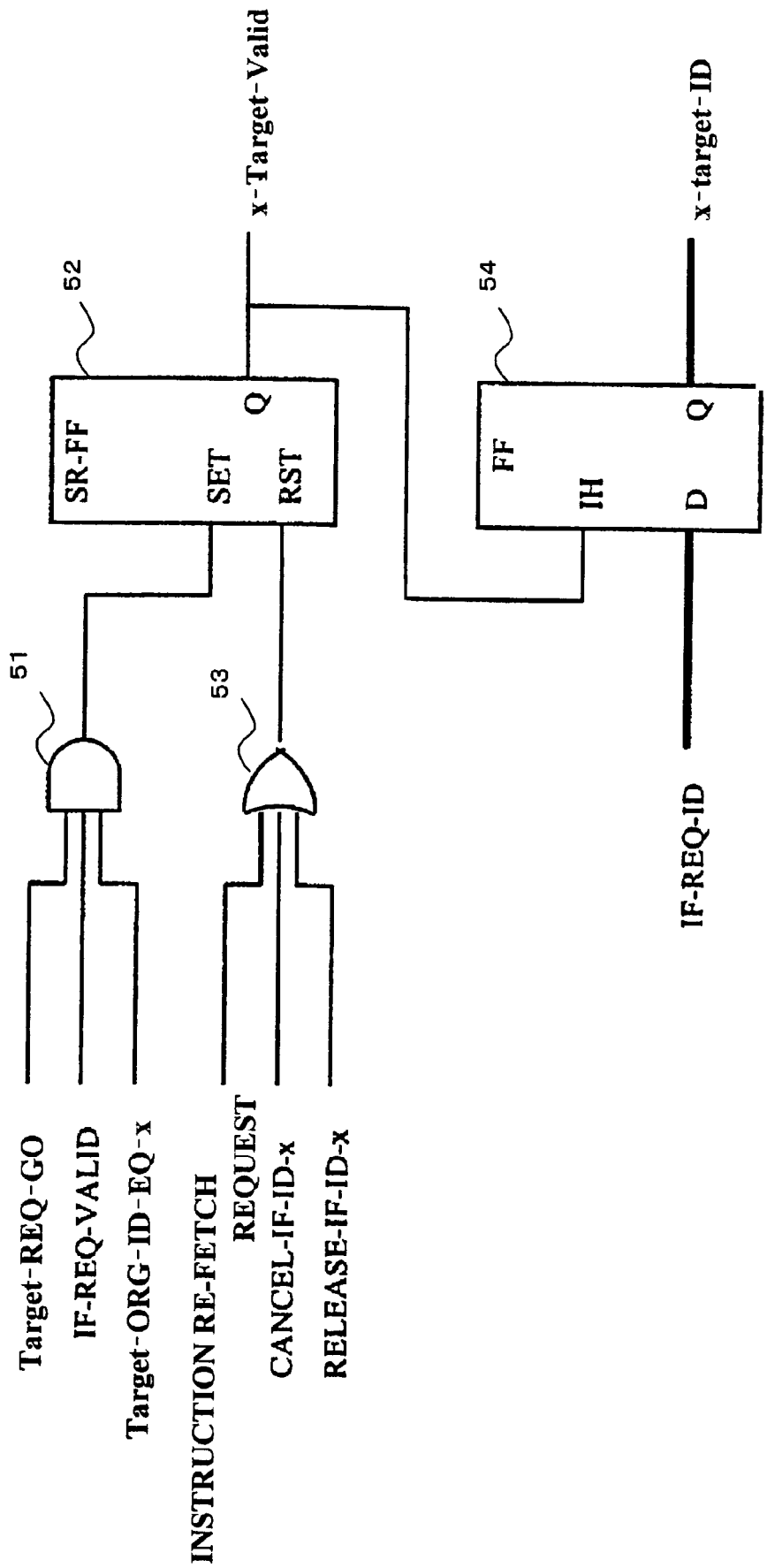
FIG. 9 shows an example of the configuration of a circuit setting a branch prediction target instruction buffer identifier (Target-ID) and a Target-ID designation valid flag (Target-Valid) in the pointer section.

FIG. 9 shows an example of the configuration of a circuit setting a branch prediction target instruction buffer identifier (Target-ID) and a Target-ID designation valid flag (Target-Valid) in the pointer section 1b described earlier. The circuit shown in FIG. 9 is also provided for each instruction buffer 1.

In FIG. 9, if signals TARGET-REQ-GO (the output of the AND circuit 24 shown in FIG. 6), IF-REQ-VALID (instruction fetch request signal) and TARGET-ORG-ID-EQ-x (x: identifier of an instruction buffer 1) are all "H", the output of an AND circuit 51 becomes "H", and "H" is input to the terminal SET of an SR-FF 52. The signal TARGET-ORG-ID-EQ-x indicates that if TARGET-ORG-ID (stored in the register 21-2 shown in FIG. 6) indicating the identifier of an instruction buffer 1 storing the instruction string of the branch prediction target instruction fetch request origin is x, the relevant signal of this circuit provided in relation to an instruction buffer 1 whose identifier is x becomes "H".

In this way, if "H" is input to the terminal SET, the output terminal Q of the SR-FF 52 becomes "H", and x-Target-Valid (x: identifier of an instruction buffer 1) is validated. Specifically, the output of the output terminal Q of the SR-FF 52 of this circuit provided in relation to an instruction buffer 1 whose identifier is x becomes "H", and a flag indicating that Target-ID is valid is set in the pointer section 1b of an instruction buffer 1 whose identifier is x as Target-Valid.

When the output terminal Q of the SR-FF 52 becomes "H", "H" is input to the terminal IH of an FF 54. Then, a signal IF-REQ-ID currently input to a terminal D is output from the output terminal Q of the FF 54 and x-Target-ID (x: identifier of an instruction buffer 1) is set. Specifically, the IF-REQ-ID output from the output terminal Q of the FF54 of this circuit provided in relation to the instruction buffer 1 whose identifier is x is set in the pointer section 1b of the instruction buffer 1 whose identifier is x as Target-ID.

However, if one of an instruction re-fetch request signal, a signal CANCEL-IF-ID-x and a signal RELEASE-IF-ID-x is "H", the output of an OR circuit 53 becomes "H", and "H" is input to the terminal RST of the SR-FF 52.

In this way, when "H" is input to the terminal RST, the output terminal Q of the SR-FF 52 becomes "L", and x-Target-Valid is nullified. Specifically, when "H" is input as a signal CANCEL-IF-ID-x or RELEASE-IF-ID-x, the output of the output terminal Q of the SR-FF 52 of this circuit provided in relation to an instruction buffer 1 whose identifier is x becomes "L", and a flag indicating that Target-ID is invalid is set in the pointer section 1b of the instruction buffer 1 whose identifier is x as Target-Valid. When an instruction re-fetch request is issued and "H" is input as an instruction re-fetch request signal, the output of the output terminal Q of each SR-FF 52 of this circuit provided for each instruction buffer 1 becomes "L", and a flag indicating that Target-ID is invalid is set in the pointer section 1b of each instruction buffer 1 as Target-Valid.

According to such a configuration, Target-ID and Target-Valid are set in the pointer section 1b.

FIG. 10 shows an example of the configuration of a circuit setting a valid flag (Valid) in the pointer section 1b described earlier. The circuit shown in FIG. 10 is provided for each instruction buffer 1.

In FIG. 10, if signals IF-REQ-VALID (instruction fetch request signal) and IF-REQ-ID-EQ-x (x: identifier of an instruction buffer 1) are both "H", the output of an AND circuit 61 becomes "H", and "H" is input to the terminal SET of an SR-FF 62. The signal IF-REQ-ID-EQ-x indicates that if IF-REQ-ID is x, the relevant signal of this circuit provided in relation to an instruction buffer 1 whose identifier is x becomes "H".

In this way, when "H" is input to the terminal SET, the output terminal Q of the SR-FF 62 becomes "H", and IBx-Valid (x: identifier of an instruction buffer 1) is validated. Specifically, the output of the output terminal Q of the SR-FF 62 of this circuit provided in relation to an instruction buffer 1 whose identifier is x becomes "H", and a flag indicating that the relevant instruction buffer is valid is set in the pointer section 1b of the instruction buffer whose identifier is x as Valid.

However, if one of an instruction re-fetch request signal, a signal CANCEL-IF-ID-x and a signal RELEASE-IF-ID-x is "H", the output of an OR circuit 63 becomes "H", and "H" is input to the terminal RST of the SR-FF 62.

In this way, when "H" is input to the terminal RST, the output terminal Q of the SR-FF 62 becomes "L", and Valid is nullified. Specifically, "H" is input as a signal CANCEL-IF-ID-x or RELEASE-IF-ID-x, the output of the output terminal Q of the SR-FF 62 of this circuit provided in relation to an instruction buffer 1 whose identifier is x becomes "L", and a flag indicating that the relevant instruction buffer 1 is invalid is set in the pointer section 1b of the instruction buffer whose identifier is x as Valid. When an instruction re-fetch request is issued and "H" is input as an instruction re-fetch request signal, the output of the output terminal Q of each SR-FF 62 of this circuit provided for each instruction buffer 1 becomes "L", and a flag indicating that the relevant instruction buffer 1 is invalid is set in the pointer section 1*b* of each instruction buffer 1 as Valid.

According to such a configuration, Valid is set in the pointer section 1*b*.

Next, the operation performed when an instruction stored in an instruction buffer 1 is supplied to the instruction execution unit is described.

Figure 11:
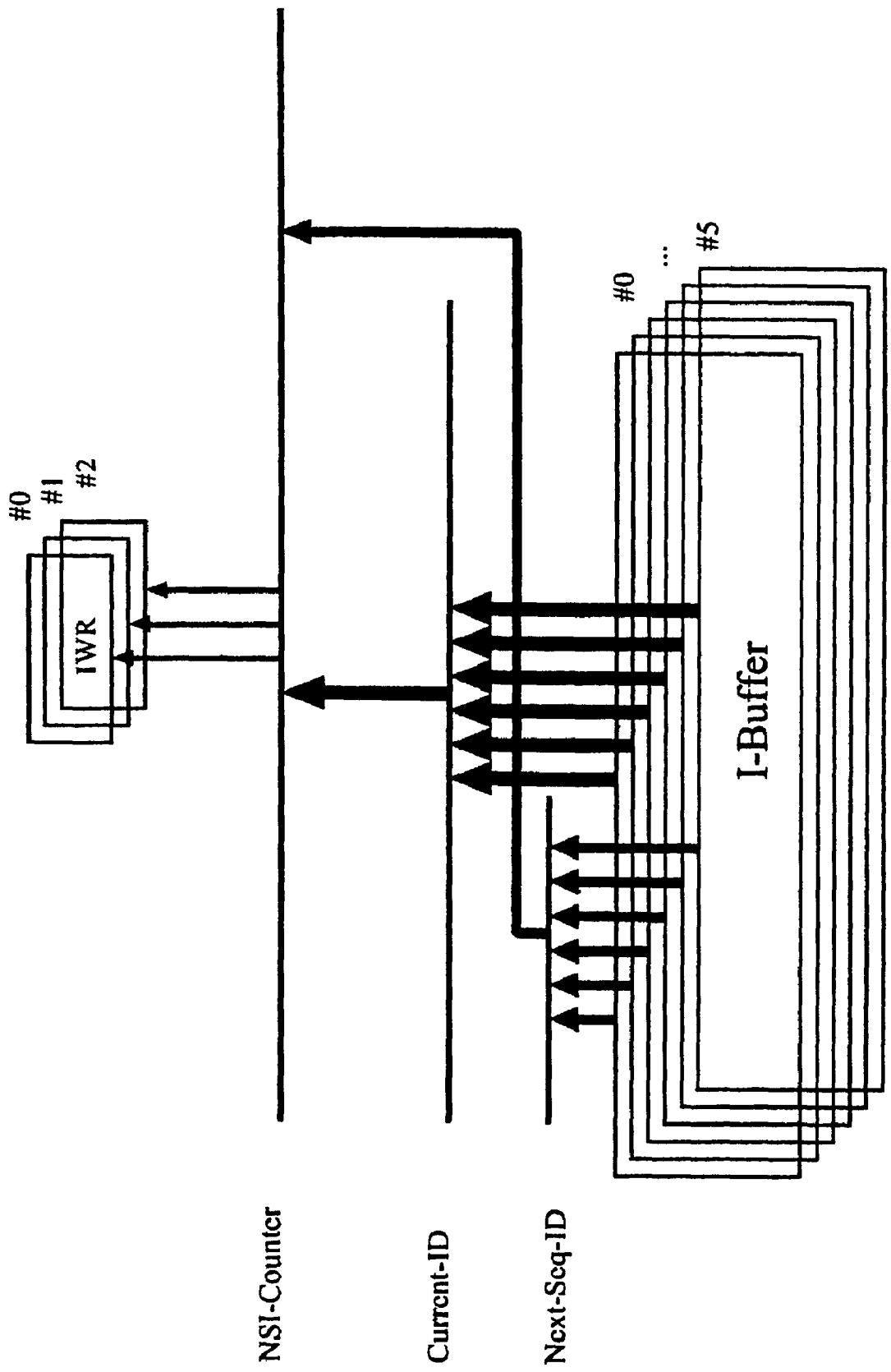
FIG. 11 shows a typical operation performed when an instruction stored in the instruction buffer is supplied to an instruction execution unit.

FIG. 11 shows such a typical operation. The operation shown in FIG. 11 corresponds to the operation surrounded with dotted lines in FIG. 6.

As shown in FIG. 11, three instructions are extracted from instruction strings stored in an instruction buffer 1, based on Current-ID, Next-Seq-ID and NSI-Counter set by the instruction supply control unit 6 and are supplied to the instruction execution unit.

Specifically, an instruction string stored in an instruction buffer 1 indicated by Next-Seq-ID is aligned next to an instruction string stored in an instruction buffer 1 indicated by Current-ID, based on Current-ID, Next-Seq-ID and NSI-Counter, three instructions from an extraction starting point which is indicated by the value of NSI-Counter (an offset value) from the head of an instruction string corresponding to Current-ID are extracted. Then, the extracted three instructions are supplied to the instruction execution unit. FIG. 11 shows the flow until storing the extracted three instructions in the registers IWR (#0, #1 and #2) of the instruction execution unit.

Since the value of NSI-Counter is an offset value from the head of an instruction string corresponding to Current-ID, that is, the extraction starting point of the three instructions to be supplied to the instruction execution unit, the range of instructions to be extracted across instruction buffers 1 indicated by Next-Seq-ID can be restricted depending on the maximum number of instructions that can be simultaneously supplied. In this way, an instruction or instructions can be partially extracted from an instruction string corresponding to Next-Seq-ID. Therefore, the size and cost of a circuit configuration can be reduced.

For example, if a set of instruction strings, including two-byte, four-byte or six-byte instruction is used, it is sufficient if 18 bytes (=6×3) can be extracted since at maximum three instructions can be extracted in this preferred embodiment. If two-byte instruction is aligned, an instruction or instructions to be extracted from an instruction string corresponding to Next-Seq-ID is 16 bytes from the head of an instruction string corresponding to Next-Seq-ID at he maximum.

Next, the setting control over Current-ID, Next-Seq-ID and NSI-Counter that the instruction supply control unit 6 performs in order to supply an instruction string stored in an instruction buffer 1 to the instruction execution unit without conflict is described.

In the setting control that the instruction supply control unit 6 performs in this preferred embodiment, basically, Current-ID, Next-Seq-ID and NSI-Counter are set for the following six cases.

The first is a case where Current-ID is invalid. Current-ID is invalid, for example, in an initial state when the data processing device has just been powered on or when the instruction cache 4 is busy, all instruction strings stored in each instruction buffer 1 have been supplied to the instruction execution unit and all instruction buffers 1 are invalid. In such a case, Current-ID is left invalid until an instruction fetch request is issued, and when an instruction fetch request is issued, the identifier of an instruction buffer 1 storing an instruction string corresponding to the instruction fetch request is set as Current-ID. Next-ID corresponding to the Current-ID is set as Next-Seq-ID. However, if Current-ID is invalid or valid Next-ID is not set in the pointer section 1*b* of an instruction buffer 1 indicated by Current-ID, Next-Seq-ID is invalid. If valid Next-ID is set in the pointer section 1*b* of an instruction buffer 1 indicated by Current-ID, the valid Next-ID is set as Next-Seq-ID. In the first case, the value of NSI-Counter is not modified.

The second is a case where instruction issuance is not permitted. In such a case, Current-ID, Next-Seq-ID and NSI-Counter are not modified. However, when a subsequent instruction fetch request is issued and valid Next-ID is set in the pointer section 1*b* of an instruction buffer 1 indicated by Current-ID, the valid Next-ID is set as Next-Seq-ID.

The third is a case where the existence of an instruction for which branch establishment has been predicted within an instruction issuance range (instruction supply range) has been detected. In such a case, Current-ID is modified/set to Target-ID stored in the pointer section 1*b* of an instruction buffer 1 indicated by the Current-ID at this time. Valid Next-ID that is stored in the pointer section 1*b* of an instruction buffer 1 indicated by the Target-ID is set as Next-Seq-ID. The position of a branch prediction target (branch prediction target address) in an instruction string stored in the instruction buffer 1 indicated by the Target-ID is set in NSI-Counter as an offset value.

Figure 12:
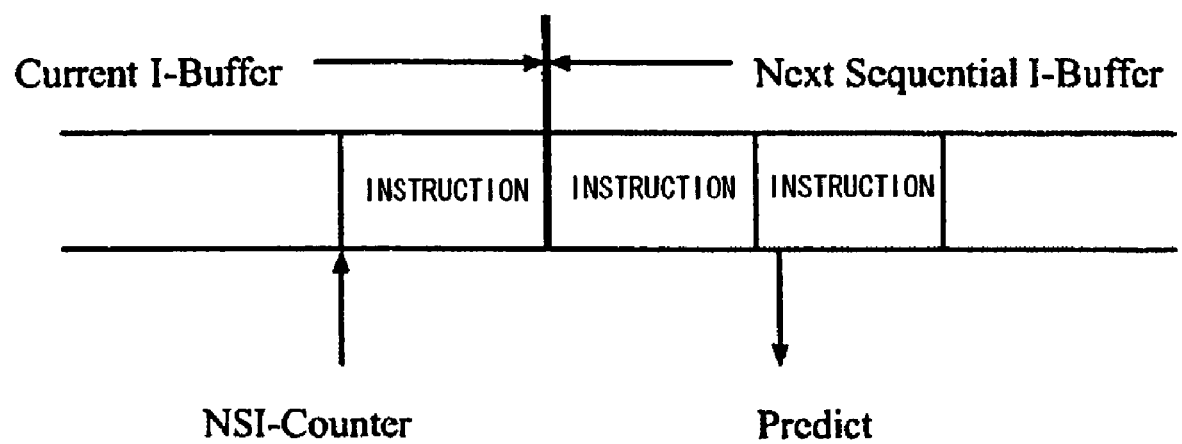
FIG. 12 shows an example of an instruction range to be extracted (No. 1)

In the third case, as shown in FIG. 12, there is, for example, a case where an instruction extraction range (instruction supply range) spans instruction strings stored in the instruction buffer 1 indicated by Next-Seq-ID (Next Sequential I-Buffer) and there is an instruction for which branch establishment has been predicted (instruction Predict in FIG. 12) in an instruction string on Next-Seq-ID side of the instruction extraction range (if there is not an instruction for which branch establishment has been predicted, it corresponds to the fourth case, which is described later). In such a case, Target-ID to be set when Current-ID is switched (modified) must be a valid Target-ID stored in the pointer section 1*b* of the instruction buffer 1 indicated by Next-Seq-ID. Therefore, the Target-ID is retrieved from information stored in the pointer section 1*b* of the instruction buffer 1 indicated by Next-Seq-ID and is set as Current-ID.

The fourth is a case where as a result of instruction issuing, carry-over is detected in NSI-Counter. When the value of NSI-Counter is 32 corresponding to 32 bytes, which is an instruction string range that an instruction buffer 1 can store, or exceeds 32, carry-over can be detected in NSI-Counter. In such a case, Current-ID is modified/set to valid Next-ID stored in the pointer section 1*b* of an instruction buffer 1 indicated by Current-ID at this time. Valid Next-ID that is stored in the pointer section 1*b* of an instruction buffer 1 indicated by the Next-ID is set as Next-Seq-ID. In NSI-Counter is set a value obtained by ignoring carry-over caused as a result of calculation. For example, if the value of NSI-Counter is 24 and the total size of three extracted instructions is 12 bytes (=4 bytes×3 instruction), 4(=24+12−32) is set in NSI-Counter.

The fifth is a case where it is detected that an instruction re-fetch request is issued. In such a case, 0 is set as Current-ID, and valid Next-ID that is stored in the pointer section 1*b*-0 of an instruction buffer 1-0 indicated by the Current-ID is set as Next-Seq-ID. However, when an instruction fetch request has been issued, a subsequent instruction fetch request has not been issued. Therefore, valid Next-ID is not stored in the pointer section 1*b*-0 and usually Next-Seq-ID is invalid. In NSI-Counter is set an offset value corresponding to an instruction re-fetch request address.

The sixth is a case where the existence of an instruction for which branch establishment has been predicted within the instruction issuance range has not been detected and as a result of instruction issuing, carry-over has not been detected in NSI-Counter. In such a case, Current-ID and Next-Seq-ID are not modified. However, if Next-Seq-ID is invalid, a subsequent instruction fetch request is issued and valid Next-ID is set in the pointer section 1b of an instruction buffer 1 indicated by Current-ID and the valid Next-ID is set as Next-Seq-ID. In NSI-Counter is set a calculation result. For example, if the value of NSI-Counter is 18 and the size of three pieces of extracted instruction is six bytes (=2 bytes×3 instruction), 24 (=18+6) is set in NSI-Counter.

By setting Current-ID, Next-Seq-ID and NSI-Counter depending on the six cases described above, an instruction can be supplied to the instruction execution unit without conflict, and accordingly, instruction fetch can be realized without conflict.

If Current-ID is switched (modified/set to) to Next-ID or Target-ID, sometimes neither a subsequent instruction fetch request nor a branch prediction target instruction fetch request has been issued. In such a case, Next-Valid and Target-valid should be false. In this case, unless the switching operation must be nullified, there is contradicted instruction supply. Therefore, in such a case, the current valid flag and Current-ID are nullified, and values are set according to the first case. If Next-ID or Target-ID to be set in Current-ID has not been determined (stored), a current valid flag is nullified. If Next-ID or Target-ID to be set in Current-ID has been determined (stored), the current valid flag is set.

If this current valid flag is invalid and ORG-ID stored in the instruction fetch request unit 2 (SEQUENTIAL-ORG-ID or TARGET-ORG-ID) and Current-ID before nullification do not match, a contradicted instruction fetch request is issued. Therefore, operation for avoiding this must be performed.

For example, if in the fourth case described above, a subsequent instruction fetch request of an instruction string corresponding to Current-ID has not been issued (a subsequent instruction fetch request of the subsequent instruction string of an instruction string stored in an instruction buffer 1 indicated by Current-ID has not been issued), SEQUENTIAL-ORG-ID should match a current ID and SEQUENTIAL-IAR should be the subsequent instruction fetch request address corresponding to the subsequent instruction string of the instruction string that is stored in an instruction buffer 1 indicated by the current ID. In this case, SEQUENTIAL-VALID is also valid. Therefore, by checking SEQUENTIAL-ORG-ID, SEQUENTIAL-IAR and SEQUENTIAL-VALID, the validity of an instruction fetch operation, whether instruction fetch has been correctly conducted, can be checked. Such a check is not necessarily conducted for all of SEQUENTIAL-ORG-ID, SEQUENTIAL-IAR and SEQUENTIAL-VALID. For example, only SEQUENTIAL-ORG-ID and Current-ID before nullification can be checked.

For example, similarly, in the third case described above, the validity of an instruction fetch operation can be checked by checking TARGET-ORG-ID, TARGET-IAR and TARGET-VALID.

Since it is at the time of instruction supply that Current-ID is invalid, at this moment there is an instruction that is being executed or an instruction that is about to be executed (for example, in a decoding stage). Therefore, if a conflict has been detected in instruction fetch by the check described above (the validity of instruction fetch has not been detected), the conflicted instruction fetch control (a variety of settings related to instruction fetch) can be discarded and cancelled by compulsorily conducting instruction re-fetch and re-performing processing from an instruction fetch when the execution of either of the existing instructions has completed.

Sometimes special control is required due to the restrictions caused by a realization method of a set of instructions and an instruction execution unit and the like. For example, in the SPARC Architecture Version 9, a delay slot instruction accompanies branch instructions. Specifically, in this architecture, the instruction after a branch instruction is always a delay slot instruction. The delay slot instruction is always executed before branching to the target of the branch instruction.

Figure 13:
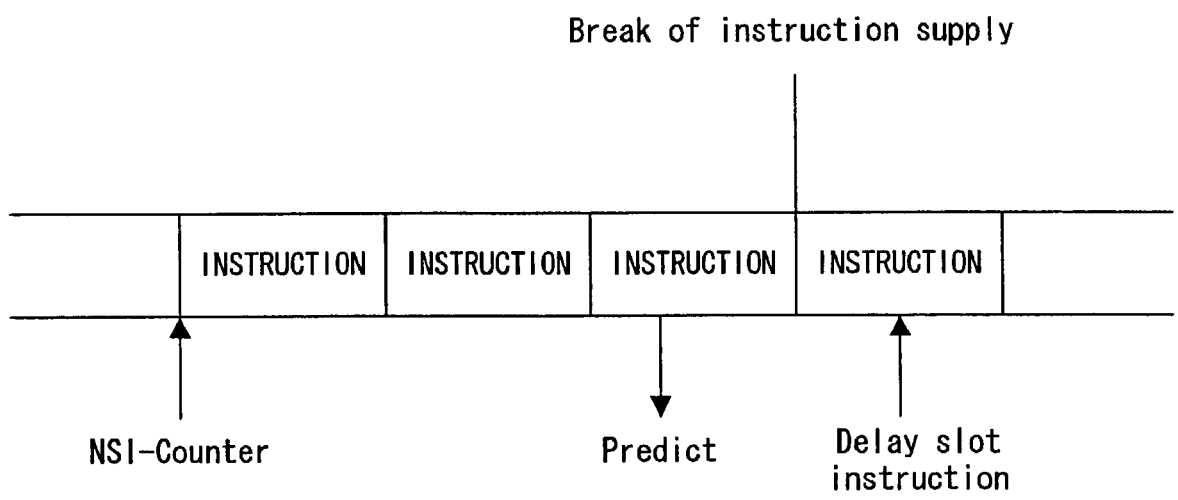
FIG. 13 shows an example of an instruction range to be extracted (No. 2).

FIG. 13 shows a case where an instruction string with such a delay slot instruction is supplied.

As shown in FIG. 13, if a series of instructions up to an instruction for which branch establishment has been predicted (instruction Predict in FIG. 13) are simultaneously supplied and an accompanying delay slot instruction is not simultaneously supplied, switching cannot be made in such a way that branch prediction target instruction strings can continue to be supplied until the delay slot instruction is supplied, despite the fact that branch establishment has been predicted.

Therefore, if such a delay slot instruction follows, Current-ID, Next-Seq-ID and NSI-Counter is set according to the following seventh and eighth cases in addition to the first through sixth cases in the setting control of the instruction supply control unit 6.

The seventh is a case where as shown in FIG. 13, although it is detected that a branch has been predicted within the instruction issuance range, a delay slot instruction is not simultaneously issued.

In such a case, Current-ID is not modified according to a calculation result based on NSI-Counter or valid Next-ID stored in the pointer section 1b of an instruction buffer 1 indicated by Current-ID at this time is set as Current-ID. However, in this case, valid Target-ID that is stored in the pointer section 1b of the instruction buffer 1 indicated by Current-ID at this time is temporarily stored taking into consideration a case where the remaining delay slot instruction is issued (the eighth case described later). Next-Seq-ID is modified/set to valid Next-ID corresponding to Current-ID that is set according to the seventh case (valid Next-ID that is stored in the pointer section 1b of the instruction buffer 1 indicated by the current ID). In NSI-Counter is set a value obtained by ignoring carry-over obtained as a result of calculation.

In the seventh case, the same setting as that of the case where the existence of an instruction for which branch establishment has been predicted is not detected.

The eighth is a case where in the seventh case, the remaining delay slot instruction is issued. In such a case, the Target-ID that is temporarily stored in the seventh case is set as Current-ID, that is, Target-ID stored in the pointer section 1b of an instruction buffer 1 storing an instruction for which branch establishment has been predicted prior to a delay slot instruction. Valid Next-ID stored in the pointer section 1b of an instruction buffer 1 corresponding to this Target-ID is set as Next-Seq-ID. In NSI-Counter is set an offset value indicating the position of a branch prediction target instruction in an instruction string stored in an instruction buffer 1 indicated by the Target-ID.

If the existence of an instruction for which branch establishment has been predicted within the instruction issuance range is detected and a delay slot instruction is simultaneously issued, the same setting as that of the third case described above is made.

In such an architecture where a delay slot instruction follows a branch instruction, when Current-ID is switched to Target-ID, sometimes a branch prediction target instruction fetch request is not issued. Therefore, in such a case, as described earlier, a current valid flag is nullified, this switching operation is nullified and values are set according to the first case.

Although so far the instruction fetch control device of the present invention has been described in detail, the present invention is not limited to the preferred embodiments described above. A variety of improvements and modifications can be applied to the present invention as long as they do not deviate from the subject matter of the present invention.

As described above, according to the present invention, the use efficiency of an instruction buffer can be improved and the instruction buffer can be compactly built.

What is claimed is:

1. An instruction fetch control device supplying instructions to an instruction execution unit, comprising:
    a plurality of instruction buffers each storing an instruction string to be supplied to the instruction execution unit;
    a designation unit designating a first instruction buffer from which the instruction string is currently supplied to the instruction execution unit, and designating a second instruction buffer storing a subsequent instruction string of the instruction buffer, as the instruction string to be supplied next,
    an instruction fetch request unit searching for one nullified instruction buffer; and
    an instruction fetch control unit making the searched for one nullified instruction buffer valid, wherein
    after an instruction string stored in an instruction buffer corresponding to a first identifier has been supplied to the instruction execution unit, the instruction fetch control unit nullifies the instruction buffer,
    the instruction string is a sequence of one or more instructions which are stored at sequential addresses of an instruction storage unit from which the instruction string is fetched and stored in the instruction buffer;
    the subsequent instruction string of the instruction string in the first instruction buffer is fetched from an address of the instruction storage unit immediately following an address from which the instruction string in the first instruction buffer is fetched, and
    the instruction fetch control device dynamically configuring the instruction buffers to be used regardless of a frequency of branch predictions.

2. The instruction fetch control device according to claim 1, further comprising:
    a first register storing a subsequent instruction fetch request address;
    a second register storing a branch prediction target instruction fetch request address; and a third register storing an instruction re-fetch request address, wherein
    an address stored in one of the first, second and third registers is set as an instruction fetch request address according to a priority defined beforehand and an instruction string corresponding to the instruction fetch request address is stored in one of the plurality of instruction buffers.

3. The instruction fetch control device according to claim 2, wherein
    said first register further stores subsequent instruction fetch request origin information designating an instruction buffer storing an instruction string of a subsequent instruction fetch request origin and said second register further stores branch prediction target instruction fetch request origin information designating an instruction buffer storing an instruction string of a branch prediction target instruction fetch request origin, and
    a first designation information designating an instruction buffer storing a subsequent instruction string to be supplied next is determined based on the subsequent instruction fetch request origin information, and a second designation information designating an instruction buffer storing a branch prediction target instruction string to be supplied next is determined based on the branch prediction target instruction fetch request origin information.

4. The instruction fetch control device according to claim 3, further comprising
    a detection unit detecting conflict in instruction fetch, based on information stored in the first or second register.

5. The instruction fetch control device according to claim 4, wherein
    if said detection unit detects a conflict in the instruction fetch, an instruction is re-fetched.

6. The instruction fetch control device according to claim 4, wherein
    said designation unit sets a first identifier designating an instruction buffer storing an instruction string to be supplied to the instruction execution unit next, and
    if the instruction buffer corresponding to the first identifier to be set next by said designation unit is not determined, and if the first identifier before the determination and an identifier corresponding to an instruction buffer designated by the subsequent instruction fetch request origin information do not match or the first identifier before the determination and the branch prediction target instruction fetch request origin information do not match, instruction fetch conflict is detected.

7. The instruction fetch control device according to claim 1, wherein
    said designation unit sets the first identifier designating an instruction buffer storing an instruction string to be next supplied to the instruction execution unit and an offset value from the head of an instruction string that is stored in an instruction buffer designated by the first identifier, and
    an instruction string whose head is an instruction determined by the first identifier and the offset value, respectively, that are set by said designation unit, is supplied to the instruction execution unit.

8. The instruction fetch control device according to claim 7, wherein
    if an instruction string with one or more instructions is supplied to the instruction execution unit, said designation unit adds a total of instruction words or instruction word lengths of the supplied instruction strings to the offset value and designates the subsequent instruction following the instruction string supplied to the instruction execution unit according to the added offset value, and
    an instruction string whose head is the designated subsequent instruction is supplied to the instruction execution unit next.

9. The instruction fetch control device according to claim 7, wherein
    if an instruction is re-fetched, said designation unit resets the first identifier and the offset value to an identifier corresponding to an instruction re-fetch request and a value corresponding to the instruction re-fetch request address, respectively.

10. The instruction fetch control device according to claim 7, wherein if at the time of setting of the first identifier, an instruction buffer corresponding to an identifier to be set as the first identifier is not determined, said designation unit nullifies the first identifier, and after the instruction buffer corresponding to an identifier to be set as the first identifier has been determined, said designation unit sets an identifier corresponding to the determined instruction buffer as the first identifier.

11. The instruction fetch control device according to claim 1, wherein if the stored instruction string includes a branch-establishment-predicted instruction, which is an instruction for which branch establishment has been predicted, information indicating the position of the branch-establishment-predicted instruction in the instruction string, is further stored in each of said plurality of instruction buffers.

12. The instruction fetch control device according to claim 1, further comprising a judgment unit judging whether a cache coherence operation is needed.

13. The instruction fetch control device according to claim 12, wherein if said judgment unit judges that a cache coherence operation is needed, all instruction buffers are nullified and an instruction is re-fetched.

14. The instruction fetch control device according to claim 1, further comprising:

an instruction fetch request unit requesting to fetch an instruction from an instruction cache to one of the instruction buffers responsive to an invalidation of one of the instruction buffers.

15. The instruction fetch control device supplying instructions to an instruction execution unit according to claim 1, wherein the instruction fetch request unit searches for an instruction buffer with the highest priority among one or more nullified instruction buffers.

16. An instruction fetch control device supplying instructions to an instruction execution unit, comprising:

a plurality of instruction buffers each storing an instruction string to be supplied to the instruction execution unit and designation information designating an instruction buffer storing an instruction string to be supplied next to the relevant instruction string;

a designation unit designating a first instruction buffer from which the instruction string is currently supplied to the instruction execution unit, and designating a second instruction buffer storing a subsequent instruction string of the instruction string in the first instruction buffer, as the instruction string to be supplied next to the instruction string in the first instruction buffer, based on the corresponding designation information in the first instruction buffer;

an instruction fetch request unit searching for one nullified instruction buffer; and an instruction fetch control unit making the searched for one nullified instruction buffer valid, wherein after an instruction string stored in an instruction buffer corresponding to a first identifier has been supplied to the instruction execution unit, the instruction fetch control unit nullifies the instruction buffer, the instruction string is a sequence of one or more instructions which are stored at sequential addresses of an instruction storage unit from which the instruction string is fetched and stored in the instruction buffer;

the subsequent instruction string of the instruction string in the first instruction buffer is fetched from an address of the instruction storage unit immediately following an address from which the instruction string in the first instruction buffer is fetched, and the instruction fetch control device dynamically configuring the instruction buffers to be used regardless of a frequency of branch predictions.

17. The instruction fetch control device according to claim 16, wherein the designation information includes first designation information designating an instruction buffer storing the subsequent instruction string to be supplied next to an instruction string stored in the relevant instruction buffer and information indicating validity of the first designation information.

18. An instruction fetch control device supplying instructions to an instruction execution unit, comprising:

a plurality of instruction buffers each storing an instruction string to be supplied to the instruction execution unit and designation information designating an instruction buffer storing an instruction string to be supplied next to the relevant instruction string; a designation unit designating a first instruction buffer from which the instruction string is currently supplied to the instruction execution unit, and designating a second instruction buffer storing a branch prediction target instruction string to be supplied next to the instruction string in the first instruction buffer, based on the designation information in the first instruction buffer;

an instruction fetch request unit searching for one nullified instruction buffer; and an instruction fetch control unit making the searched for one nullified instruction buffer valid, wherein after an instruction string stored in an instruction buffer corresponding to a first identifier has been supplied to the instruction execution unit, the instruction fetch control unit nullifies the instruction buffer, the instruction string is a sequence of one or more instructions which are stored at sequential addresses of an instruction storage unit from which the instruction string is fetched and stored in the instruction buffer, and the instruction fetch control device dynamically configuring the instruction buffers to be used regardless of a frequency of branch predictions.

19. The instruction fetch control device according to claim 18, wherein the designation information includes second designation information designating an instruction buffer storing the branch prediction target instruction string to be supplied next to an instruction string stored in the relevant instruction buffer and information indicating validity of the second designation information.

20. An instruction fetch control device supplying instructions to an instruction execution unit, comprising:

a plurality of instruction buffers each storing an instruction string to be supplied to the instruction execution unit and designation information designating an instruction buffer storing an instruction string to be supplied next to the relevant instruction string;

a designation unit designating a first instruction buffer from which the instruction string is currently supplied to the instruction execution unit, and designating a second instruction buffer storing an instruction string to be supplied next to the instruction string in the first instruction buffer, based on the designation information in the first instruction buffer, an instruction fetch request unit searching for one nullified instruction buffer; and an instruction fetch control unit making the searched for one nullified instruction buffer valid, wherein after an instruction string stored in an instruction buffer corresponding to a first identifier has been supplied to the instruction execution unit, the instruction fetch control unit nullifies the instruction buffer, the instruction string is a sequence of one or more instructions which are stored at sequential addresses of an instruction storage unit from which the instruction string is fetched and stored in the instruction buffer;

the designation unit setting a first identifier designating the first instruction buffer, setting an offset value from a head of the instruction string that is stored in the first instruction buffer, and setting a second identifier corresponding to the second instruction buffer that is designated by designation information stored in the first instruction buffer, and an instruction string stored across a plurality of instruction buffers is supplied to the instruction execution unit, based on the first and second identifiers and the offset value that the designation unit sets regardless whether the instruction string includes a branch instruction or not, and the instruction fetch control device dynamically configuring the instruction buffers to be used regardless of a frequency of branch predictions.

21. The instruction fetch control device according to claim 20, wherein when the instruction string is supplied to the instruction execution unit, the designation unit adds total length of instruction words or instruction word lengths of the supplied instruction string to the offset value; and said designation unit sets an identifier corresponding to the second instruction buffer as the first identifier if a result of the addition exceeds the instruction string size which the first instruction buffer can store.

22. The instruction fetch control device according to claim 20, wherein if a branch-establishment-predicted instruction, which is an instruction for which branch establishment has been predicted, is supplied to the instruction execution unit and an instruction string to be supplied next is a branch prediction target instruction of the branch-establishment-predicted instruction, said designation unit sets an identifier corresponding to a third instruction buffer storing the branch prediction target instruction string that is designated by the designation information stored in the first instruction buffer storing the branch-establishment-predicted instruction, as the first identifier, and sets a value corresponding to a position in the branch prediction target instruction string of the branch prediction target instruction as the offset value.

23. The instruction fetch control device according to claim 20, wherein if speculative fetch is cancelled, an instruction buffer storing the cancelled instruction string is nullified and the designation information stored in the nullified instruction buffer is nullified.

24. The instruction fetch control device according to claim 20, wherein if an architecture with a branch instruction followed by a delay slot instruction is used and the branch prediction target instruction of the instruction for which branch establishment has been predicted is supplied to the instruction execution unit, said designation unit sets the first and second identifiers and the offset value in such a way that the branch prediction target instruction can be supplied after the delay slot instruction.

25. An instruction fetch control method for supplying instructions to an instruction execution unit, comprising designating a first instruction buffer from which the instruction string is currently supplied to the instruction execution unit and designating a second instruction buffer storing a subsequent instruction string of the instruction string in the first instruction buffer, as the instruction string to be supplied next to the instruction string in the first instruction buffer;

searching for one nullified instruction buffer;

making the searched for one nullified instruction buffer valid; and nullifying a relevant instruction buffer after an instruction string stored in an instruction buffer corresponding to a first identifier has been supplied to the instruction execution unit, and wherein the first and second instruction buffers are designated from among a plurality of instruction buffers each storing an instruction string to be supplied to the instruction execution unit;

the instruction string is a sequence of one or more instructions which are stored at sequential addresses of an instruction storage unit from which the instruction string is fetched and stored in the instruction buffer;

the subsequent instruction string of the instruction string in the first instruction buffer is fetched from an address of the instruction storage unit immediately following an address from which the instruction string in the first instruction buffer is fetched, and the instruction buffer dynamically configured to be used regardless of a frequency of branch predictions.

26. An instruction fetch control method for supplying instructions to an instruction execution unit, comprising:

(a) designating a first instruction buffer from which the instruction string is currently supplied to the instruction execution unit, and designating either an instruction buffer as a second instruction buffer storing a subsequent instruction string of the instruction string in the first instruction buffer, as the instruction string to be supplied next to the instruction string in the first instruction buffer, an instruction buffer as a third instruction buffer storing a branch prediction target instruction string to be supplied next to the instruction string in the first instruction buffer or both of an instruction buffer as the second instruction buffer storing a subsequent instruction string to be supplied next to the instruction string in the first instruction buffer, and an instruction buffer as the third instruction buffer storing the branch prediction target instruction string to be supplied next to the instruction string in the first instruction buffer, wherein the first, second and third instruction buffers are designated from among a plurality of instruction buffers each of which stores an instruction string to be supplied to the instruction execution unit and designation information designating an instruction buffer storing an instruction string to be supplied next to the relevant instruction string;

the second and third instruction buffer is designated based on the designation information in the first instruction buffer;

searching for one nullified instruction buffer;

making the searched for one nullified instruction buffer valid; and nullifying a relevant instruction buffer after an instruction string stored in an instruction buffer corresponding to a first identifier has been supplied to the instruction execution unit, and the instruction buffers dynamically configured to be used regardless of a frequency of branch predictions.

27. The instruction fetch control method according to claim 26, wherein the designation information includes first designation information designating an instruction buffer storing a subsequent instruction string to be supplied next to an instruction string stored in the relevant instruction buffer and information indicating validity of the first designation information.

28. The instruction fetch control method according to claim 27, wherein the designation information further includes second designation information designating an instruction buffer storing a branch prediction target instruction string to be supplied next to an instruction string stored in the relevant instruction buffer and information indicating validity of the second designation information.

29. The instruction fetch control method according to claim 28, further comprising (b) setting an address stored in one of a first register storing a subsequent instruction fetch request address, a second register storing a branch prediction target instruction fetch request address and a third register storing an instruction re-fetch request address as an instruction fetch request address according to a priority defined beforehand, and storing an instruction string corresponding to the instruction fetch request address in one of the instruction buffers.

30. The instruction fetch control method according to claim 29, further comprising (c) determining the first designation information, based on subsequent instruction fetch request origin information designating an instruction buffer storing a subsequent instruction fetch request origin instruction string stored in the first register and determining the second designation information, based on a branch prediction target instruction fetch request origin information designating an instruction buffer storing a branch prediction target instruction fetch request origin instruction string stored in the second register.

31. The instruction fetch control method according to claim 30, wherein step (a) further includes (d) setting a first identifier designating an instruction buffer storing an instruction string to be supplied next to the instruction execution unit and an offset value from the head of the instruction string stored in the instruction buffer designated by the first identifier, and an instruction string whose head is an instruction determined by the first identifier and offset value, respectively, that are set, is supplied to the instruction execution unit.

32. The instruction fetch control method according to claim 31, wherein step (a) further includes (e) setting an identifier corresponding to an instruction buffer that is designated by the first designation information stored in the relevant instruction buffer as a second identifier designating an instruction buffer storing an instruction string to be supplied next to an instruction string stored in an instruction buffer designated by the first identifier, and an instruction string stored across a plurality of instruction buffers is supplied to the instruction execution unit, based on the first and second identifiers and offset values that are set.

33. The instruction fetch control method according to claim 32, wherein step (a) further includes (m) setting the first and second identifiers and an offset value in such a way that a branch prediction target instruction can be supplied after a delay slot instruction, if an architecture with a branch instruction followed by a delay slot instruction is used and a branch prediction target instruction of an instruction for which branch establishment has been predicted is supplied to the instruction execution unit.

34. The instruction fetch control method according to claim 31, wherein step (a) further includes (f) adding the total length of instruction words or instruction word lengths that are supplied, to the offset value and designating a subsequent instruction following an instruction string supplied to the instruction execution unit, based on the added offset value, when an instruction string with one or more instructions are supplied to the instruction execution unit, and an instruction string whose head is the designated subsequent instruction is supplied to the instruction execution unit next.

35. The instruction fetch control method according to claim 31, wherein step (a) further includes (g) resetting the first identifier as an identifier corresponding to an instruction re-fetch request and re-setting the offset value as a value corresponding to an instruction re-fetch request address if an instruction is re-fetched.

36. The instruction fetch control method according to claim 31, wherein step (a) further includes (h) setting an identifier corresponding to an instruction buffer that is designated by the first designation information stored in an instruction buffer designated by the first identifier, as the first identifier, if an instruction string with one or more instructions is supplied to the instruction execution unit and if when the total length of instruction words or instruction word lengths of the supplied instruction string are added to the offset value, the result exceeds the instruction string size which the instruction buffer can store.

37. The instruction fetch control method according to claim 31, wherein step (a) further includes (i) setting an identifier corresponding to an instruction buffer storing a branch prediction target instruction string that is designated by the second designation information stored in the instruction buffer storing an instruction for which branch establishment has been predicted, as the first identifier and setting a value corresponding to a position in the branch prediction target instruction string of a branch prediction target instruction, as the offset value, if the instruction for which branch establishment has been predicted is supplied to the instruction execution unit and a next instruction string to be supplied is a branch prediction target instruction of the instruction for which branch establishment has been predicted.

38. The instruction fetch control method according to claim 31, wherein step (a) further includes (j) nullifying the first identifier and setting an identifier corresponding to the determined instruction buffer as the first identifier after an instruction buffer corresponding to an identifier to be set as the first identifier has been determined, if at the time of the setting of the first identifier, the instruction buffer corresponding to an identifier to be set as the first identifier is not determined.

39. The instruction fetch control method according to claim 31, further comprising (p) detecting conflict in instruction fetch, based on information stored in the first or second register.

40. The instruction fetch control method according to claim 39, further comprising
   (q) re-fetching an instruction if in step (p) conflict in the instruction fetch has been detected.

41. The instruction fetch control method according to claim 39, wherein step (p) further comprises
   (r) detecting conflict in instruction fetch, if an instruction buffer corresponding to the first identifier to be set next is not determined and if the first identifier before the determination and an identifier corresponding to an instruction buffer designated by the subsequent instruction fetch request origin information do not match or the first identifier before the determination and the branch prediction target instruction fetch request origin information do not match.

42. The instruction fetch control method according to claim 26, further comprising
   (l) nullifying an instruction buffer storing a cancelled instruction string and nullifying the designation information stored in the nullified instruction buffer, if speculative fetch is cancelled.

43. The instruction fetch control method according to claim 26, further comprising
   (n) judging whether a cache coherence operation is needed.

44. The instruction fetch control method according to claim 43, further comprising
   (o) nullifying all instruction buffers and re-fetching an instruction, if in step (n) it is judged that a cache coherence operation is needed.

45. An instruction fetch control device supplying instructions to instruction execution means, comprising:
   a plurality of instruction buffer means for each storing instruction string to be supplied to the instruction execution unit; and
   designation means for designating a first instruction buffer means from which the instruction string is currently supplied to the instruction execution means, and designating a second instruction buffer means storing a subsequent instruction string of the instruction string in the first instruction buffer means, as the instruction string to be supplied next to the instruction string in the first instruction buffer means,
   instruction fetch request means for searching for one nullified instruction buffer means; and
   instruction fetch control means for making the searched for one nullified instruction buffer means valid,
   wherein after an instruction string stored in instruction buffer means corresponding to a first identifier has been supplied to the instruction execution means, the instruction fetch control means nullifies the instruction buffer means,
   the instruction string is a sequence of one or more instructions which are stored at sequential addresses of instruction storage means from which the instruction string is fetched and stored in the instruction buffer means; and
   the subsequent instruction string of the instruction string in the first instruction buffer means is fetched from an address of the instruction storage means immediately following an address from which the instruction string in the first instruction buffer means is fetched, and
   the instruction fetch control device dynamically configuring the instruction buffer means to be used regardless of a frequency of branch predictions.

46. An instruction fetch control device supplying instructions to an instruction execution unit, comprising:
   instruction buffers storing a sequence of one or more instructions stored in sequence; and
   a designation unit designating a first instruction buffer from which the instruction string is currently supplied to the instruction execution unit, and designating another of the instruction buffers storing an instruction fetched from an address of the instruction storage unit immediately following an address from which the instruction string in the first instruction buffer is fetched, as the instruction string to be supplied next,
   an instruction fetch request unit searching for one nullified instruction buffer; and
   an instruction fetch control unit making the searched for one nullified instruction buffer valid, wherein
   after an instruction string stored in an instruction buffer corresponding to a first identifier has been supplied to the instruction execution unit, the instruction fetch control unit nullifies the instruction buffer, and
   the instruction fetch control device dynamically configuring the instruction buffers to be used regardless of a frequency of branch predictions.

47. An instruction fetch control device supplying instructions to an instruction execution unit, comprising:
   a plurality of instruction buffers for supplying the instructions to the instruction execution unit, each instruction buffer comprising:
   a data section storing an instruction string;
   a pointer section, the pointer section storing:
      a branch prediction target instruction buffer identifier identifying one of the instruction buffers storing a branch prediction target instruction,
      a subsequent instruction buffer identifier identifying one of the instruction buffers storing a subsequent instruction string;
   an instruction fetch request unit searching for one nullified instruction buffer; and
   an instruction fetch control unit making the searched for one nullified instruction buffer valid, wherein
   after an instruction string stored in an instruction buffer corresponding to a first identifier has been supplied to the instruction execution unit, the instruction fetch control unit nullifies the instruction buffer, the instruction fetch control device dynamically configuring the instruction buffers to be used regardless of a frequency of branch predictions.

48. A method of supplying instructions to an instruction execution unit from an instruction fetch control device, comprising:
   identifying an instruction buffer storing a branch prediction target instruction;
   identifying an instruction buffer storing a subsequent instruction string;
   searching for one nullified instruction buffer;
   making the searched for one nullified instruction buffer valid; and
   nullifying a relevant instruction buffer after an instruction string stored in an instruction buffer corresponding to a first identifier has been supplied to the instruction execution unit, and
   dynamically configuring the instruction buffers so as to be useable regardless of a frequency of branch predictions; and
   supplying the instructions to the instruction execution unit.

* * * * *

UNITED STATES PATENT AND TRADEMARK OFFICE
CERTIFICATE OF CORRECTION

PATENT NO.       : 7,783,868 B2  
APPLICATION NO.  : 10/368670  
DATED            : August 24, 2010  
INVENTOR(S)      : Masaki Ukai Page 1 of 1

It is certified that error appears in the above-identified patent and that said Letters Patent is hereby corrected as shown below:

Column 22, line 58, in claim 26, delete "is" and insert -- are --, therefor.

Signed and Sealed this  
Twenty-eighth Day of December, 2010

David J. Kappos  
*Director of the United States Patent and Trademark Office*

UNITED STATES PATENT AND TRADEMARK OFFICE
CERTIFICATE OF CORRECTION

PATENT NO. : 7,783,868 B2  Page 1 of 1
APPLICATION NO. : 10/368670
DATED : August 24, 2010
INVENTOR(S) : Masaki Ukai It is certified that error appears in the above-identified patent and that said Letters Patent is hereby corrected as shown below:

Column 22, line 58, in claim 26:
Delete "buffer" and insert -- buffers --

Signed and Sealed this
Twenty-sixth Day of April, 2011

David J. Kappos
*Director of the United States Patent and Trademark Office*